(12) United States Patent
Wang

(10) Patent No.: US 12,497,429 B2
(45) Date of Patent: *Dec. 16, 2025

(54) SAPONIN-BASED VACCINE ADJUVANTS

(71) Applicant: THE UAB RESEARCH FOUNDATION, Birmingham, AL (US)

(72) Inventor: Pengfei Wang, Hoover, AL (US)

(73) Assignee: THE UAB RESEARCH FOUNDATION, Birmingham, AL (US)

( * ) Notice: Subject to any disclaimer, the term of this patent is extended or adjusted under 35 U.S.C. 154(b) by 1010 days.

This patent is subject to a terminal disclaimer.

(21) Appl. No.: 16/981,939

(22) PCT Filed: Mar. 20, 2019

(86) PCT No.: PCT/US2019/023067
§ 371 (c)(1),
(2) Date: Sep. 17, 2020

(87) PCT Pub. No.: WO2019/183159
PCT Pub. Date: Sep. 26, 2019

(65) Prior Publication Data
US 2021/0040143 A1 Feb. 11, 2021

Related U.S. Application Data

(60) Provisional application No. 62/645,497, filed on Mar. 20, 2018.

(51) Int. Cl.
| | | |
|---|---|---|
| *C07J 63/00* | (2006.01) | |
| *A61K 36/42* | (2006.01) | |
| *A61K 39/00* | (2006.01) | |
| *A61K 39/39* | (2006.01) | |
| *A61P 37/04* | (2006.01) | |
| *C07H 15/20* | (2006.01) | |

(52) U.S. Cl.
CPC ............. *C07J 63/008* (2013.01); *A61K 39/39* (2013.01); *A61K 2039/55577* (2013.01)

(58) Field of Classification Search
None
See application file for complete search history.

(56) References Cited

U.S. PATENT DOCUMENTS

| | | | | |
|---|---|---|---|---|
| 6,080,725 A | * | 6/2000 | Marciani | A61K 47/542 |
| | | | | 514/25 |
| 2015/0050319 A1 | * | 2/2015 | Wang | C07J 63/008 |
| | | | | 424/278.1 |

FOREIGN PATENT DOCUMENTS

| | | |
|---|---|---|
| WO | 2013/142142 A1 | 9/2013 |
| WO | 2019/183159 A1 | 9/2019 |

OTHER PUBLICATIONS

Higuchi, Ryuichi, et al. "Structure of desacylsaponins obtained from the bark of *Quillaja saponaria*." Phytochemistry 26.1 (1987): 229-235. (Year: 1987).*
Wang, Pengfei, et al. "Synthesis and evaluation of QS-21-based immunoadjuvants with a terminal-functionalized side chain incorporated in the west wing trisaccharide." The Journal of organic chemistry 81.20 (2016): 9560-9566 and S1-S18. (Year: 2016).*
European Extended Search Report, EP Patent Application No. 20772529.2, mailed Nov. 23, 2022.
Wang, Pengfei, et al., "Synthesis and Evaluation of QS-21-Based Immunoadjuvants with Terminal-Functionalized Side Chain Incorporated in the West Wing Trisaccharide," The Journal of Organic Chemistry, vol. 81, No. 20 (2016), pp. 9560-9566.
Zheng, Quan, et al., "Pancreatic Lipase-Inhibiting Triterpenoid Saponins from Gypsophila oldhamiana," Chem. Pharm. Bull., vol. 55, No. 4 (2007), pp. 646-650.
Nagao, Tsuneatsu, et al., "Studies on the constituents of Thladiantha dubia BUNGE. I. The Structures of Dubiosides A, B., C, the Quillaic Acid Glucuronide Saponins Isolated from the Tuber," Chem. Pharm. Bull., vol. 37, No. 4 (1989), pp. 958-929.
Wang, Pengfei, et al., "Vaccine Adjuvants Derivatized from Momordica Saponins I and II," Journal of Medicinal Chemistry, vol. 62, No. 21 (2019), pp. 9976-9982.
Wang, Pengfei, et al., "Structural Effect on Adjuvanticity of Saponins," Journal of Medicinal Chemistry, vol. 63, No. 6 (2020), pp. 3290-3297.
Brunner, Richard et al. "The ABC of clinical and experimental adjuvants—a brief overview." Immunology letters vol. 128, 1 (2010): 29-35. doi:10.1016/j.imlet.2009.10.005.
Kensil, Charlotte Read et al. "Current vaccine adjuvants: an overview of a diverse class." Frontiers in bioscience : a journal and virtual library vol. 9 2972-88. Sep. 1, 2004, doi:10.2741/1452.
Leroux-Roels, Geert. "Unmet needs in modern vaccinology: adjuvants to improve the immune response." Vaccine vol. 28 Suppl 3 (2010): C25-36. doi: 10.1016/j.vaccine.2010.07.021.
Sharp, Fiona A. et al., "Discovery of Vaccine Adjuvants", Development of Therapeutic Agents Handbook, First Edition, Edited by Shayne Cox Gad. © 2012 John Wiley & Sons, Inc. Published 2012 by John Wiley & Sons, Inc., pp. 533-546.
Wang W. et al., "Selection of Adjuvants for Enhanced Vaccine Potency", World Journal of Vaccines, 2011, 1, 33-78.
Weeratna Risni D. et al., "Recent Advances in Vaccine Adjuvants", pp. 303-322.
Cox, J C, et al., "Adjuvants—a classification and review of their modes of action." Vaccine vol. 15,3 (1997): 248-56. doi:10.1016/s0264-410x(96)00183-1.
Klebanoff, Christopher A et al. "Therapeutic cancer vaccines: are we there yet?." Immunological reviews vol. 239,1 (2011): 27-44. doi:10.1111/j.1600-065X.2010.00979.x.

(Continued)

*Primary Examiner* — Kyle A Purdy
*Assistant Examiner* — Peter Anthopolos
(74) *Attorney, Agent, or Firm* — Thomas|Horstemeyer, LLP

(57) ABSTRACT

Provided are variants of saponins that are found in Quillaja saponaria (QS) Molina tree bark that are chemically modified to distinguish them from naturally occurring parent saponins. The modified saponins have increased adjunctive activity compared to the unmodified parent saponins. Defined structures allow for comparisons of the modifying groups with respect to their respective adjunct activity and permit characterized vaccine formulations that have one or more defined saponins.

16 Claims, 14 Drawing Sheets

(56) References Cited

OTHER PUBLICATIONS

Plotkin SA., Vaccines: past, present and future:. Nat Med. Apr. 2005;11(4 Suppl):S5-11. doi: 10.1038/nm1209. PMID: 15812490; PMCID: PMC7095920.

Rappuoli R, Aderem A., " A 2020 vision for vaccines against HIV, tuberculosis and malaria"., Nature. May 26, 2011;473 (7348):463-9. doi: 10.1038/nature10124. PMID: 21614073.

Kensil et al., "Effects of QS-21 on Innate and Adaptive Immune Responses", Vaccine Adjuvants: Immunological and Clinical Principles, 2005, pp. 221-234.

Ragupathi, Govind et al. "Natural and synthetic saponin adjuvant QS-21 for vaccines against cancer." Expert review of vaccines vol. 10,4 (2011): 463-70. doi:10.1586/erv. 11.18.

Deng, Kai et al. "Synthesis of QS-21-xylose: establishment of the immunopotentiating activity of synthetic QS-21 adjuvant with a melanoma vaccine." Angewandte Chemie (International ed. in English) vol. 47,34 (2008): 6395-8. doi:10.1002/anie.200801885.

Kensil, C R. "Saponins as vaccine adjuvants." Critical reviews in therapeutic drug carrier systems vol. 13,1-2 (1996): 1-55.

Kensil, C R et al. "Separation and characterization of saponins with adjuvant activity from Quillaja saponaria Molina cortex." Journal of immunology (Baltimore, Md. : 1950) vol. 146,2 (1991): 431-7.

Ragupathi, Govind et al. "Preclinical evaluation of the synthetic adjuvant SQS-21 and its constituent isomeric saponins." Vaccine vol. 28,26 (2010): 4260-7. doi:10.1016/j.vaccine.2010.04.034.

Wang, Pengfei et al. "Synthesis of the potent immunostimulatory adjuvant QS-21A." Journal of the American Chemical Society vol. 127,10 (2005): 3256-7. doi:10.1021/ja0422007.

Adams, Michelle M et al. "Design and synthesis of potent Quillaja saponin vaccine adjuvants." Journal of the American Chemical Society vol. 132,6 (2010): 1939-45. doi:10.1021/ja9082842.

Chea, Eric K et al. "Synthesis and preclinical evaluation of QS-21 variants leading to simplified vaccine adjuvants and mechanistic probes." Journal of the American Chemical Society vol. 134,32 (2012): 13448-57. doi:10.1021/ja305121q.

Fernández-Tejada, Alberto et al. "Development of a minimal saponin vaccine adjuvant based on QS-21." Nature chemistry vol. 6,7 (2014): 635-43. doi:10.1038/nchem. 1963.

Wang, Pengfei, et al. "Synthesis of QS-21-Based Immunoadjuvants", 2013 American Chemical Society, J. Org. Chem. 2013, 78, 11525-11534.

Slovin, Susan F et al. "A bivalent conjugate vaccine in the treatment of biochemically relapsed prostate cancer: a study of glycosylated MUC-2-KLH and Globo H-KLH conjugate vaccines given with the new semi-synthetic saponin immunological adjuvant GPI-0100 or QS-21." Vaccine vol. 23,24 (2005): 3114-22. doi:10.1016/j.vaccine. 2005.01.072.

Lieberman MM, et al., "Immunogenicity and protective efficacy of a recombinant subunit West Nile virus vaccine in rhesus monkeys"., Clin Vaccine Immunol. Sep. 2009; 16(9):1332-7. doi: 10.1128/CVI. 00119-09. Epub Jul. 29, 2009. PMID: 19641099; PMCID: PMC2745014.

Liu, Heng et al. "Preclinical evaluation of the saponin derivative GPI-0100 as an immunostimulating and dose-sparing adjuvant for pandemic influenza vaccines." Vaccine vol. 29,11 (2011): 2037-43. doi:10.1016/j.vaccine.2011.01.012.

Quenelle, Debra C et al. "Effect of immunization with herpes simplex virus type-1 (HSV-1) glycoprotein D (gD) plus the immune enhancer GPI-0100 on infection with HSV-1 or HSV-2." Vaccine vol. 24, 10 (2006): 1515-22. doi:10.1016/j.vaccine.2005.10.017.

Zhang, Ping et al. "Effectiveness of the quillaja saponin semi-synthetic analog GPI-0100 in potentiating mucosal and systemic responses to recombinant HagB from Porphyromonas gingivalis." Vaccine vol. 21,27-30 (2003): 4459-71. doi:10.1016/s0264-410x(03)00438-9.

Wang, Pengfei et al. "Simple glycosylation reaction of allyl glycosides." The Journal of organic chemistry vol. 72, 15 (2007): 5870-5873. doi:10.1021/jo070512x.

Wang, Yun et al., "Concise synthesis of Bacillus anthracis exosporium tetrasaccharide via two-stage activation of allyl glycosyl donor strategy", Tetrahedron Letters 52 (2011) 3912-3915, Department of Chemistry, University of Alabama at Birmingham, Birmingham, AL 35294, USA.

Wang, Yun et al. "Facile glycosylation strategy with two-stage activation of allyl glycosyl donors. Application to concise synthesis of Shigella flexneri serotype Y O-antigen." Organic & biomolecular chemistry vol. 8, 19 (2010): 4322-8. doi:10.1039/c002865g.

Yang, Haishen, and Pengfei Wang. "Mechanistic study of glycosylation using a prop-1-enyl donor." The Journal of organic chemistry vol. 78,5 (2013): 1858-63. doi:10.1021/jo301664c.

Marciani, D J et al. "Development of semisynthetic triterpenoid saponin derivatives with immune stimulating activity." Vaccine vol. 18,27 (2000): 3141-3151. doi:10.1016/s0264-410x(00)00118-3.

Marciani, D J et al. "Altered immunomodulating and toxicological properties of degraded Quillaja saponaria Molina saponins." International immunopharmacology vol. 1,4 (2001): 813-8. doi:10.1016/s1567-5769(01)00016-9.

Marciani, Dante J et al. "Degradation of Quillaja saponaria Molina saponins: loss of the protective effects of a herpes simplex virus 1 subunit vaccine." International immunopharmacology vol. 2,12 (2002): 1703-11. doi:10.1016/s1567-5769(02)00192-3.

Soltysik, S et al. "Structure/function studies of QS-21 adjuvant: assessment of triterpene aldehyde and glucuronic acid roles in adjuvant function." Vaccine vol. 13,15 (1995): 1403-10. doi:10.1016/0264-410x(95)00077-e.

Liu, Gui et al. "QS-21 structure/function studies: effect of acylation on adjuvant activity." Vaccine vol. 20,21-22 (2002): 2808-15. doi:10.1016/s0264-410x(02)00209-8.

Marciani, Dante J et al. "Quillaja saponin adjuvants: derivatives formed under sub-optimal conditions." Vaccine vol. 20,27-28 (2002): 3237-8. doi:10.1016/s0264-410x(02)00298-0.

Gaddis, Dalia E et al. "Role of TLR2-dependent IL-10 production in the inhibition of the initial IFN-γ T cell response to Porphyromonas gingivalis." Journal of leukocyte biology vol. 93,1 (2013): 21-31. doi:10.1189/jlb.0512220.

Gaddis, Dalia E et al. "Requirement of TLR4 and CD14 in dendritic cell activation by Hemagglutinin B from Porphyromonas gingivalis." Molecular immunology vol. 46,13 (2009): 2493-504. doi:10.1016/j.molimm.2009.05.022.

Gaddis, Dalia E et al. "TLR4 signaling via MyD88 and TRIF differentially shape the CD4+ T cell response to Porphyromonas gingivalis hemagglutinin B." Journal of immunology (Baltimore, Md. : 1950) vol. 186,10 (2011): 5772-83. doi:10.4049/jimmunol. 1003192.

Katz, J et al. "Host responses to recombinant hemagglutinin B of Porphyromonas gingivalis in an experimental rat model." Infection and immunity vol. 67,9 (1999): 4352-9. doi:10.1128/IAI.67.9.4352-4359.1999.

Yang, Qiu-Bo et al. "Mechanisms of monophosphoryl lipid A augmentation of host responses to recombinant HagB from Porphyromonas gingivalis." Infection and immunity vol. 70,7 (2002): 3557-65. doi:10.1128/IAI.70.7.3557-3565.2002.

Zhang, Ping et al. "Role of CD80 and CD86 in host immune responses to the recombinant hemagglutinin domain of Porphyromonas gingivalis gingipain and in the adjuvanticity of cholera toxin B and monophosphoryl lipid A." Vaccine vol. 25,33 (2007): 6201-10. doi:10.1016/j.vaccine.2007.05.066.

Zhang, Ping et al. "Role of mitogen-activated protein kinases and NF-kappaB in the regulation of proinflammatory and anti-inflammatory cytokines by Porphyromonas gingivalis hemagglutinin B." Infection and immunity vol. 73,7 (2005): 3990-8. doi:10.1128/IAI.73.7.3990-3998.2005.

Zhang, Ping et al. "Role of B7 costimulatory molecules in immune responses and T-helper cell differentiation in response to recombinant HagB from Porphyromonas gingivalis." Infection and immunity vol. 72,2 (2004): 637-44. doi:10.1128/IAI.72.2.637-644.2004.

Deng, Kai et al. "Synthesis and structure verification of the vaccine adjuvant QS-7-Api. Synthetic access to homogeneous Quillaja saponaria immunostimulants." Journal of the American Chemical Society vol. 130,18 (2008): 5860-1. doi:10.1021/ja801008m.

(56) References Cited

OTHER PUBLICATIONS

Higuchi R et al., "Structure of Desacylsaponins Obtained From the Bark of Quillaja Saponaria", Phytochemistry, vol. 26, No. I. pp. 229 235. 1987. Printed in Great Bntain.
Kite, Geoffrey C et al. "Metabolomic analysis of saponins in crude extracts of Quillaja saponaria by liquid chromatography/mass spectrometry for product authentication." Rapid communications in mass spectrometry : RCM vol. 18,23 (2004): 2859-70. doi:10.1002/rcm.1698.
Rhodes, J. "Covalent chemical events in immune induction: fundamental and therapeutic aspects." Immunology today vol. 17,9 (1996): 436-41. doi:10.1016/0167-5699(96)10050-5.
Ashtekar, Amit R et al. "TLR4-mediated activation of dendritic cells by the heat shock protein Dnak from Francisella tularensis." Journal of leukocyte biology vol. 84,6 (2008): 1434-46. doi:10.1189/jlb.0308215.
Ashtekar, Amit R et al. "A mucosal subunit vaccine protects against lethal respiratory infection with Francisella tularensis LVS." PloS one vol. 7,11 (2012): e50460. doi:10.1371/journal.pone.0050460.
Wang, Pengfei et al. "Synthesis and Evaluation of QS-21-Based Immunoadjuvants with a Terminal-Functionalized Side Chain Incorporated in the West Wing Trisaccharide." The Journal of organic chemistry vol. 81,20 (2016): 9560-9566. doi:10.1021/acs.joc.6b00922.
International Search Report and Written Opinion for PCT/US2019/023067 mailed on Jun. 10, 2019.
Kim et al. 'Synthetic Studies of Complex Immunostimulants from Quillaja saponaria: Synthesis of the Potent Clinical Immunoadjuvant QA-21Aapi', Journal of American Chemical Society, 2006, vol. 128, pp. 11906-11915.
Fernandez-Tejada et al. 'Development of Improved Vaccine Adjuvants Based on the Saponin Natural Product QS-21 through Chemical Synthesis', Accounts of Chemical Research, 2016, vol. 49, pp. 1741-1756.
Chea, Eric K., et al., "Synthesis and Preclinical Evaluation of QS-21 Variants Leading to Simplified Vaccine Adjuvants and Mechanistic Probes," Journal of American Chemical Society, vol. 134 (2012), pp. 13448-13457.
Japanese Office Action for Application No. 2021-555818, mailed Nov. 5, 2024, 2 pages (Translation not Included).
Masayo Iwamoto et al,. "Studies on the constituents of Momordica cochinchinensis Spreng. I. Isolation and characterization of the seed saponins, Momordica saponins I and II." Chemical and Pharmaceutical Bulletin, 1985, vol. 33, No. 2, pp. 464-478, DOI: 10.1248/cpb.33.464.

\* cited by examiner

SAPONIN-BASED VACCINE ADJUVANTS

CROSS-REFERENCE TO RELATED APPLICATION

This application is the 35 U.S.C. § 371 national stage application of PCT Application No. PCT/US2019/023067, entitled "SAPONIN-BASED VACCINE ADJUVANTS", filed Mar. 20, 2019, where the PCT claims priority to U.S. Provisional Application No. 62/645,497, entitled "SAPONIN-BASED VACCINE ADJUVANTS" filed on Mar. 20, 2018, the entireties of which are herein incorporated by reference.

STATEMENT REGARDING FEDERALLY SPONSORED RESEARCH OR DEVELOPMENT

This invention was made with Government Support under contracts AI099407, GM120159, and AI121586, awarded by the National Institutes of Health. The Government has certain rights in the invention.

TECHNICAL FIELD

The present disclosure is generally related to saponin-based vaccine adjuvants.

BACKGROUND

Efforts in developing new vaccines against cancers and infectious diseases have relied heavily on subunit antigen constructs. However, the refined and homogeneous antigens are often less immunogenic, which necessitates the use of immune adjuvants. Adjuvants are agents added to, or used in conjunction with, vaccine antigens to augment or potentiate the specific immune response to the antigen. Despite the obvious benefits, the choice of adjuvant for human vaccines is severely limited. Currently, only a few adjuvants have been approved for use in the United States, e.g., (1) alum (several aluminum salts); (2) 4'-monophosphoryl lipid A (MPL), a derivative of lipopolysaccharide, adsorbed to alum (AS04); and (3) MF59, an oil-in-water emulsion of squalene oil. Alum is only efficient in eliciting a high antibody response with a Th2 profile; it is a poor inducer of protective Th1 response necessary for vaccines against intracellular pathogens (e.g., HIV, TB and malaria) and cancers. MF59 is for influenza vaccines, and AS04, a combination adjuvant composed of monophosphoryl lipid A (MPL) adsorbed to alum is for HBV and HPV vaccines in Europe and in the USA. Despite the progress, developing subunit vaccines is still bottlenecked by the lack of safe and effective adjuvants. Vaccine adjuvants are an urgent need and priority for vaccine research. Discovery of novel and defined adjuvants has emerged as a critical frontline effort in the development of modern vaccine formulations.

Saponin immunostimulatory adjuvants, especially the extracts from the Quillaja saponaria (QS) Molina tree bark, show promising adjuvant activity. Among the only four purified and characterized components of the complex tree bark extract, the component QS-21 now is one of the most sought after human vaccine adjuvants and it is also a key component in the new adjuvant systems AS01 and AS15 currently being tested in clinical trials by the pharmaceutical industry. In 2017, QS-21 was approved by FDA for human vaccine use as a key component of the AS01b adjuvant system.

However, naturally occurring QS adjuvants have inherent drawbacks such as chemical instability, limited supply, difficult and low-yielding purification, and dose-limiting toxicity, which are the hurdles to their wider clinical use.

SUMMARY

One aspect of the disclosure, therefore, encompasses embodiments of a modified saponin having the formula:

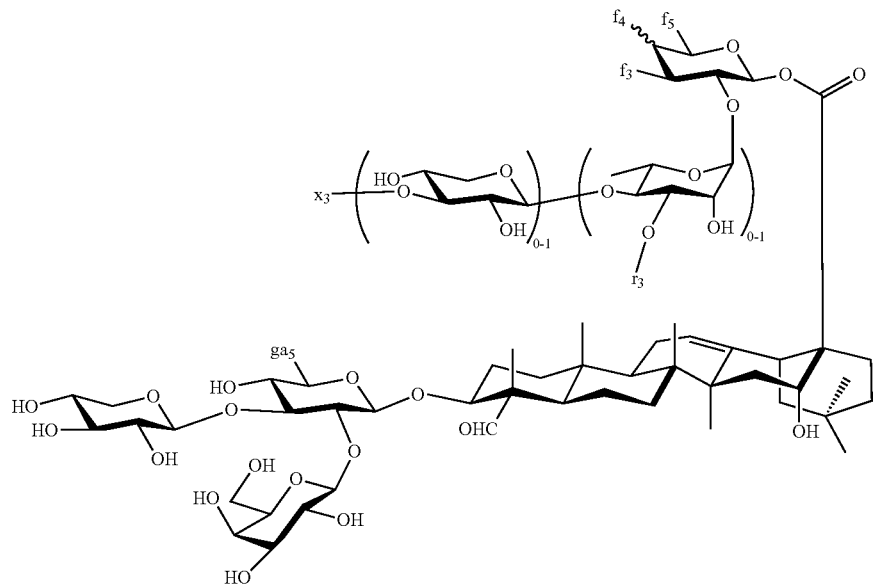

wherein: q1 can be H or OH; f3 and f4 can be each independently OH, acetyl, or a cyclic ketal ring or cyclic carbonate ester formed by the C3 and C4 of the fucosyl unit, f3, and f4; f5 can be a methyl group, a carboxyl group, $R_4$—$NR_5$—C(O)—, or an alkoxy group having the structure $R_4$—O—, wherein $R_4$ and $R_5$ can be each independently a linear chain having the structure $R_6(CH_2)_{0-20}$—, and wherein $R_6$ can be H, OH, COOH, COOMe, COOEt, COOiPr, COOtBu, or COOBn; r3 can be H, a monosaccharide, a disaccharide, or a trisaccharide; x3 can be H, a monosaccharide, or a disaccharide; and ga5 can be a carboxyl group, $R_4$—$NR_5$—$C(O)$—, or an alkoxy group having the structure $R_4$—O—, wherein $R_4$ and $R_5$ are each independently a linear chain having the structure $R_6(CH_2)_{0-20}$—, and wherein $R_6$ is H, OH, COOH, COOMe, COOEt, COOiPr, COOtBu, COOBn, a saccharide unit, a monophosphoryl lipid A (MPL), or a dipalmitoyl-S-glyceryl cysteine (PamCys) unit.

In some embodiments of this aspect of the disclosure the modified saponin can have the formula I:

In some embodiments of this aspect of the disclosure $R_3$ can be $R_4$—NH—CO—, wherein $R_4$ can be a long-chain fatty acid having the structure HOOC—$(CH_2)_{6-20}$—.

In some embodiments of this aspect of the disclosure $R_3$ can be $R_4$—NH—CO—, wherein $R_4$ can be a long-chain fatty acid having the structure HOOC—$(CH_2)_{11}$.

In some embodiments of this aspect of the disclosure $R_3$ can be an alkoxy group having the structure $H_3C$—$(CH_2)_{6-20}$—O—.

In some embodiments of this aspect of the disclosure $R_3$ can be $R_4$—NH—CO—, wherein $R_4$ can be a long-chain alcohol having the structure HO—$(CH_2)_{6-20}$—.

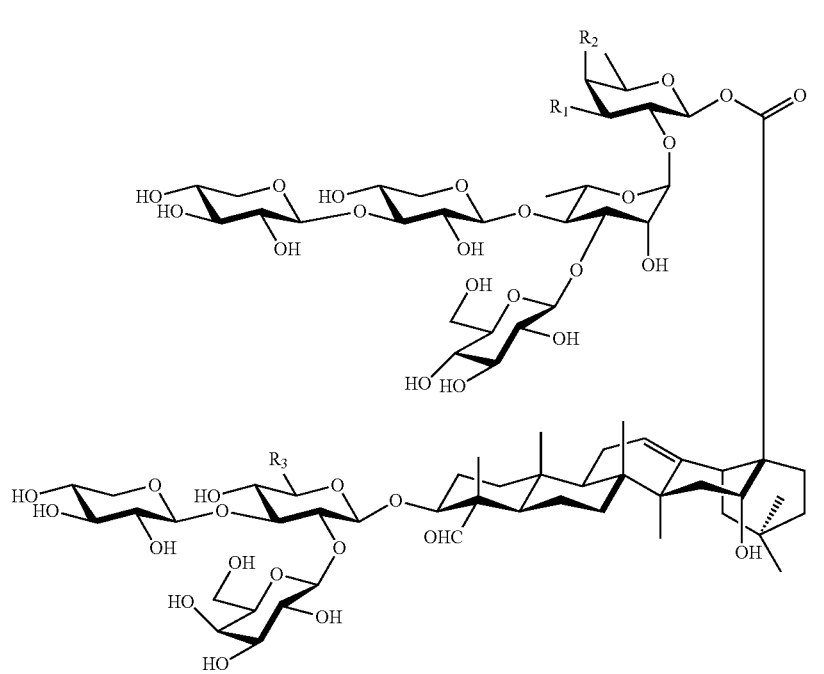

wherein: $R_1$ and $R_2$ can be each independently OH, acetyl, or a cyclic ketal ring or cyclic carbonate ester formed by the C3 and C4 of the fucosyl unit, $R_1$, and $R_2$; $R_3$ can be a carboxyl group, $R_4$—$NR_5$—$C(O)$—, or an alkoxy group having the structure $R_4$—O—, wherein $R_4$ and $R_5$ can be each independently a linear chain can have the structure $R_6(CH_2)_{0-20}$—, and wherein $R_6$ can be H, OH, COOH, COOMe, COOEt, COOiPr, COOtBu, COOBn, a saccharide unit, a monophosphoryl lipid A (MPL), or a dipalmitoyl-S-glyceryl cysteine (PamCys) unit.

In some embodiments of this aspect of the disclosure $R_1$ and $R_2$ can be each OH.

In some embodiments of this aspect of the disclosure $R_1$ and $R_2$ can be each acetyl.

In some embodiments of this aspect of the disclosure $R_1$ and $R_2$ form an acetonide group protecting the 3-OH and the 4-OH of the fucosyl unit.

In some embodiments of this aspect of the disclosure $R_1$ and $R_2$ form a carbonate ester group protecting the 3-OH and the 4-OH of the fucosyl unit.

In some embodiments of this aspect of the disclosure $R_3$ can be a carboxyl group.

In some embodiments of this aspect of the disclosure $R_3$ can be $R_4$—NH—CO—, wherein $R_4$ can be a long-chain terminated with a functional group selected from an ester group, an ether group, an amino group, a cyano group, a carbonyl group, an azido group, and an aromatic group.

In some embodiments of this aspect of the disclosure $R_3$ can be $R_4$—NH—CO—, wherein $R_4$ can be a saccharide unit selected from the group consisting of a monosaccharide, a disaccharide, and trisaccharide.

In some embodiments of this aspect of the disclosure $R_3$ can be $R_4$—NH—CO—, wherein $R_4$ can be a MPL unit.

In some embodiments of this aspect of the disclosure $R_3$ can be $R_4$—NH—CO—, wherein $R_4$ can be a Pam2Cys unit or Pam3Cys unit.

In some embodiments of this aspect of the disclosure the modified saponin can be a semisynthetic analog selected from the group consisting of A-D, and can have any of the formulas:

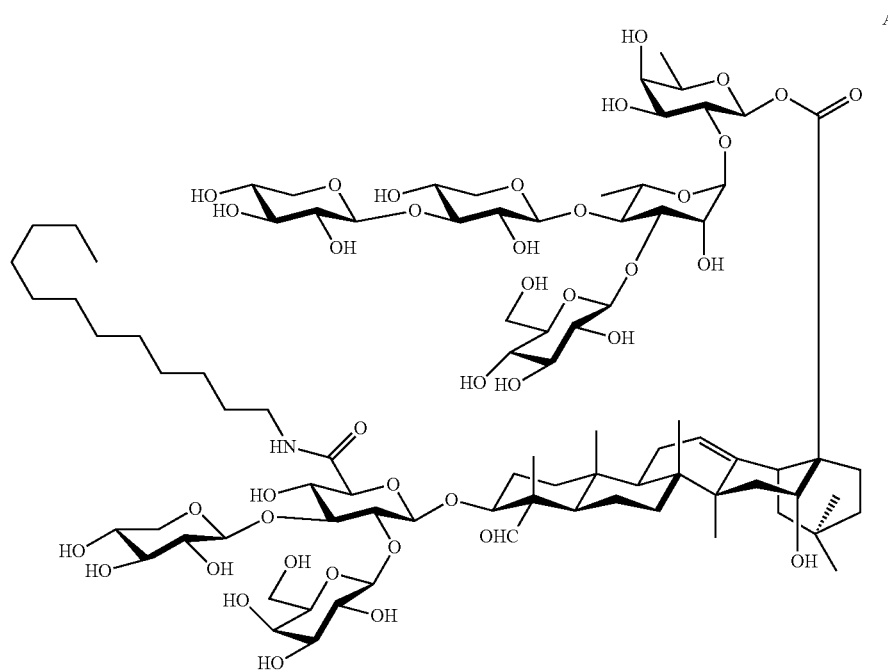
A
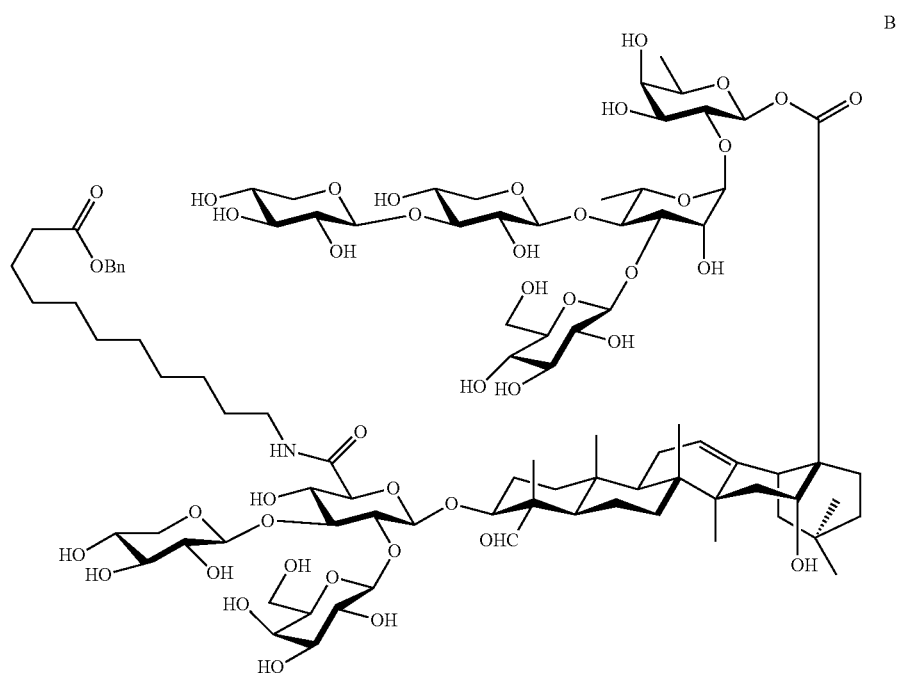
B

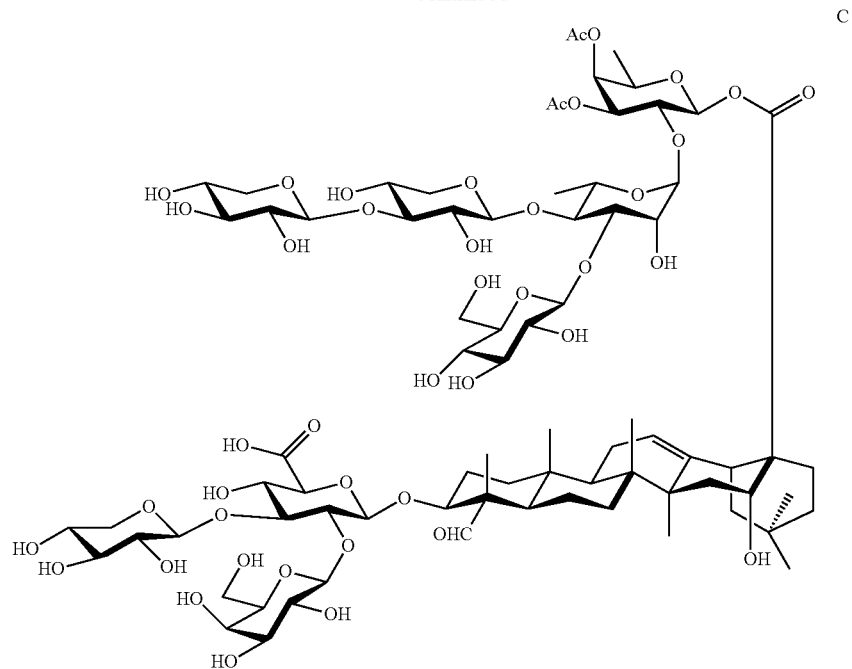
C
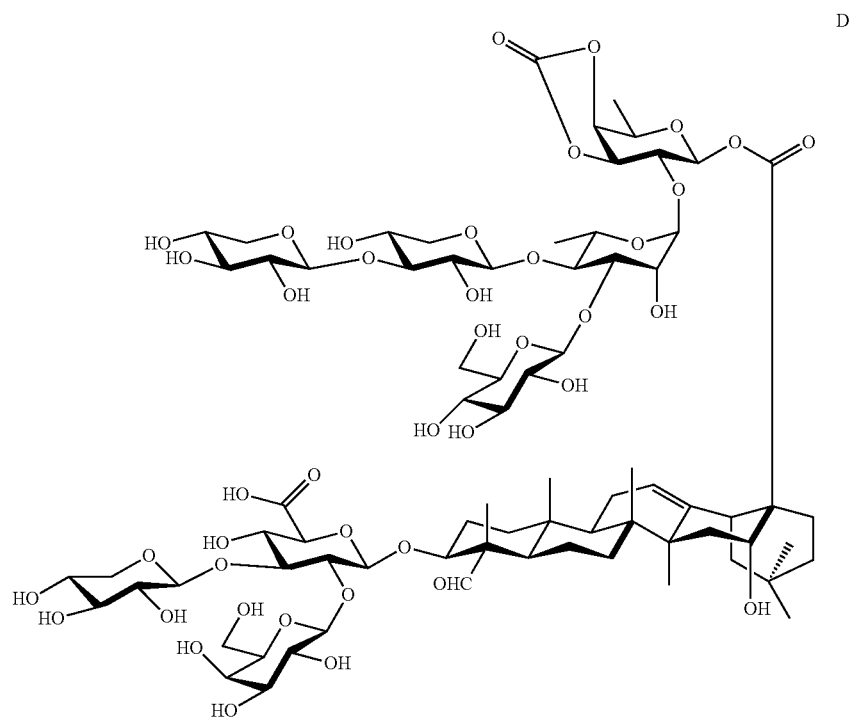
D

In some embodiments of this aspect of the disclosure the modified saponin can be an immunomodulatory increasing the antigenicity of an immunogen when co-administered therewith to an animal or human.

Another aspect of the disclosure encompasses embodiments of a pharmaceutical composition comprising a modified saponin having the formula I:

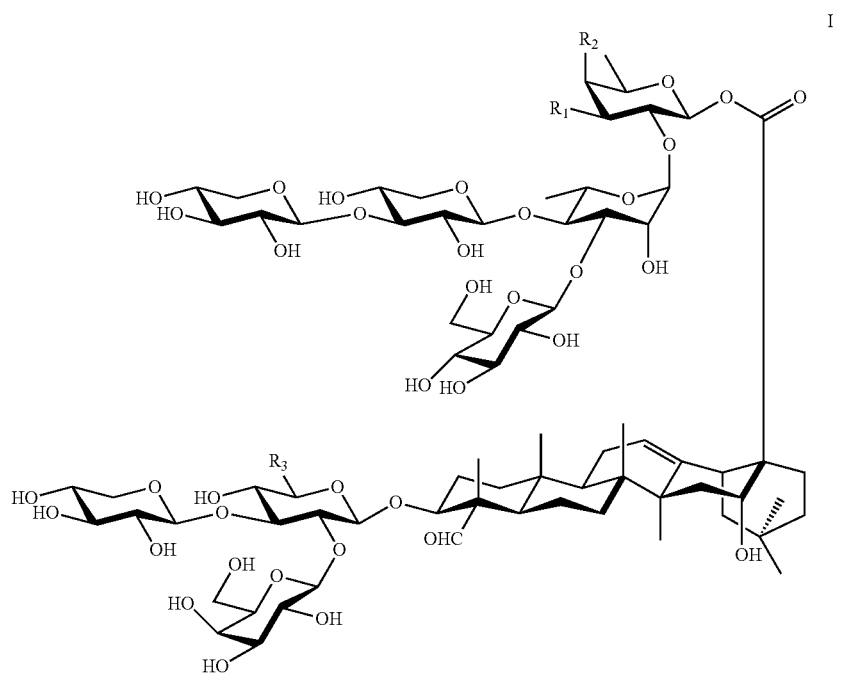

wherein: $R_1$ and $R_2$ can be each independently OH, acetyl, or a cyclic ketal ring or cyclic carbonate ester formed by the C3 and C4 of the fucosyl unit, $R_1$, and $R_2$; $R_3$ can be a carboxyl group, $R_4$—$NR_5$—C(O)—, or an alkoxy group having the structure $R_4$—O—, wherein $R_4$ and $R_5$ can be each independently a linear chain having the structure $R_6(CH_2)_{0-20}$—, and wherein $R_6$ can be H, OH, COOH, COOMe, COOEt, COOiPr, COOtBu, COOBn, a saccharide unit, a monophosphoryl lipid A (MPL), or a dipalmitoyl-S-glyceryl cysteine (PamCys) unit.

In some embodiments of this aspect of the disclosure $R_1$ and $R_2$ can be each OH.

In some embodiments of this aspect of the disclosure $R_1$ and $R_2$ can be each acetyl.

In some embodiments of this aspect of the disclosure $R_3$ can be an acyl group.

In some embodiments of this aspect of the disclosure $R_3$ can be $R_4$—NH—CO—, wherein $R_4$ can be a long-chain fatty acid having the structure HOOC—$(CH_2)_{6-20}$—.

In some embodiments of this aspect of the disclosure $R_3$ can be $R_4$—NH—CO—, wherein $R_4$ can be a long-chain fatty acid having the structure HOOC—$(CH_2)_{11}$.

In some embodiments of this aspect of the disclosure $R_3$ can be an alkoxy group having the structure $H_3C$—$(CH_2)_{6-20}$—CO—.

In some embodiments of this aspect of the disclosure the pharmaceutical composition can comprise a saponin analog selected from the group consisting of A-D, and can have any of the formulas:

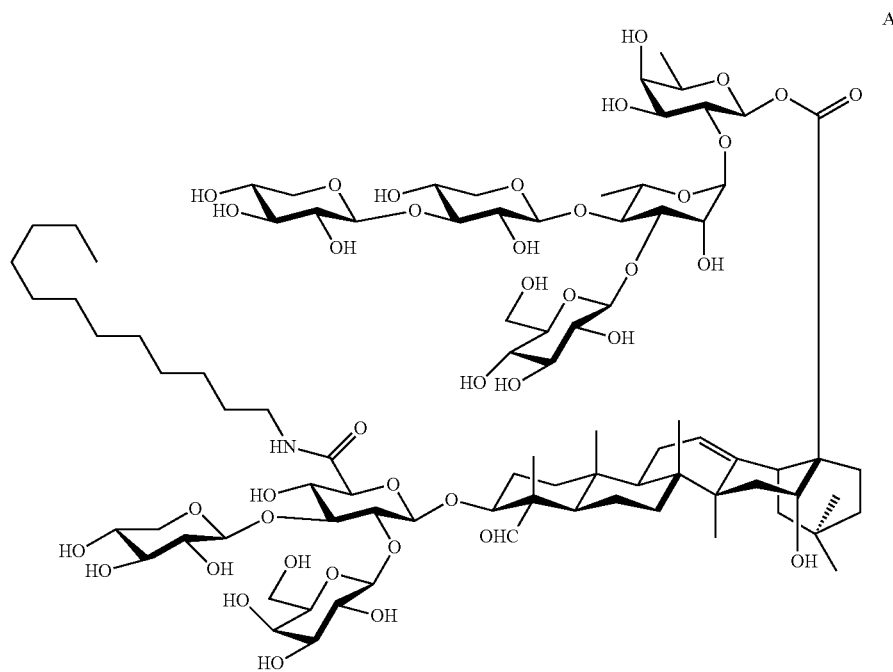
A
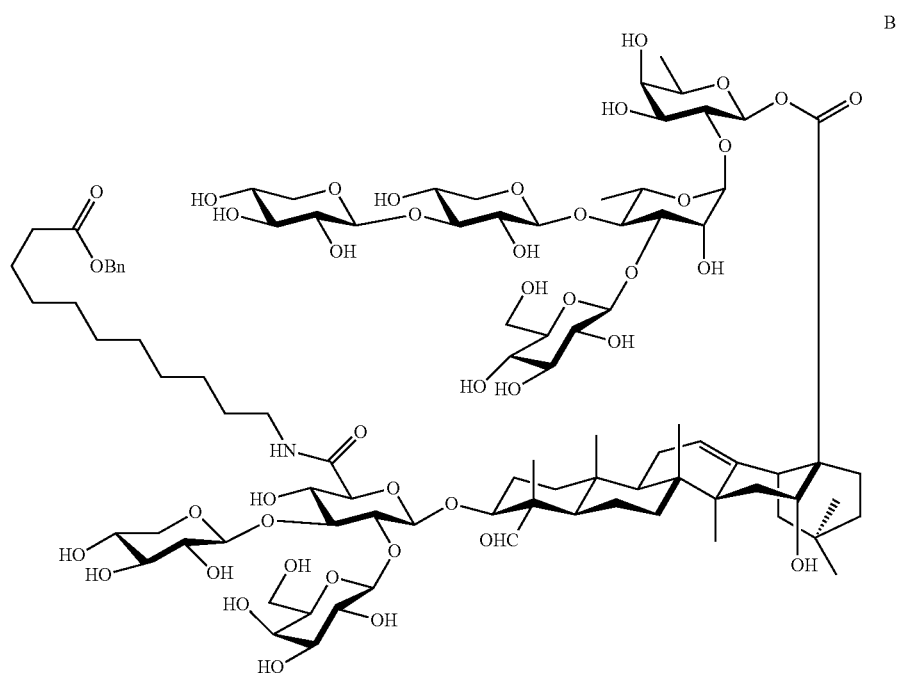
B

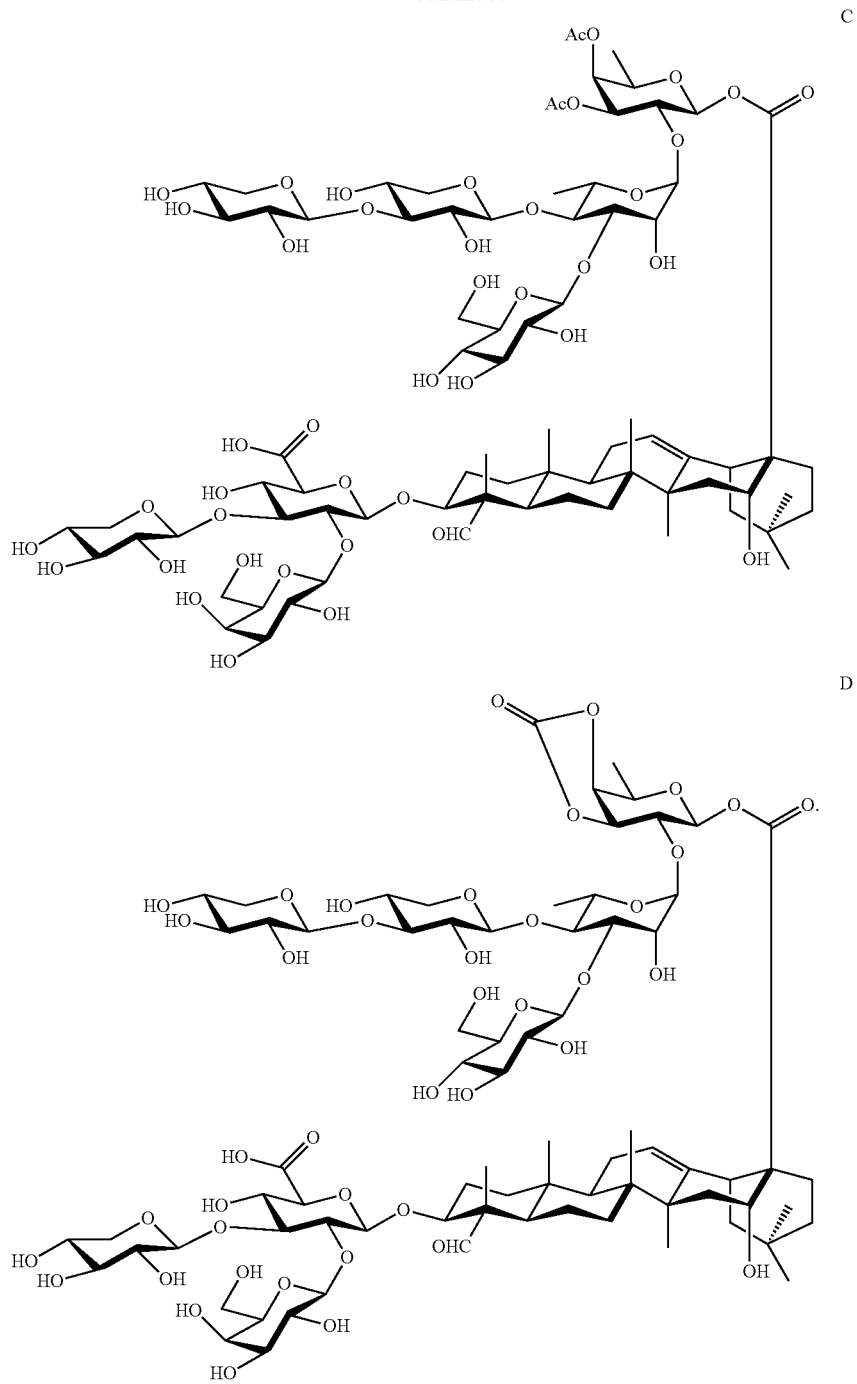

In some embodiments of this aspect of the disclosure the pharmaceutical composition can further comprise at least one immunogen and a pharmaceutically acceptable carrier.

In some embodiments of this aspect of the disclosure the pharmaceutical composition can be formulated for administering to an animal or human subject.

Yet another aspect of the disclosure encompasses embodiments of a method of increasing the immunogenicity of an immunogen when administered to an animal or human subject comprising the steps of co-administering to the subject a vaccine comprising at least one modified saponin adjunct of the disclosure and an immunogenic moiety.

BRIEF DESCRIPTION OF THE DRAWINGS

Further aspects of the present disclosure will be more readily appreciated upon review of the detailed description of its various embodiments, described below, when taken in conjunction with the accompanying drawings.

DETAILED DESCRIPTION

Figure 1:
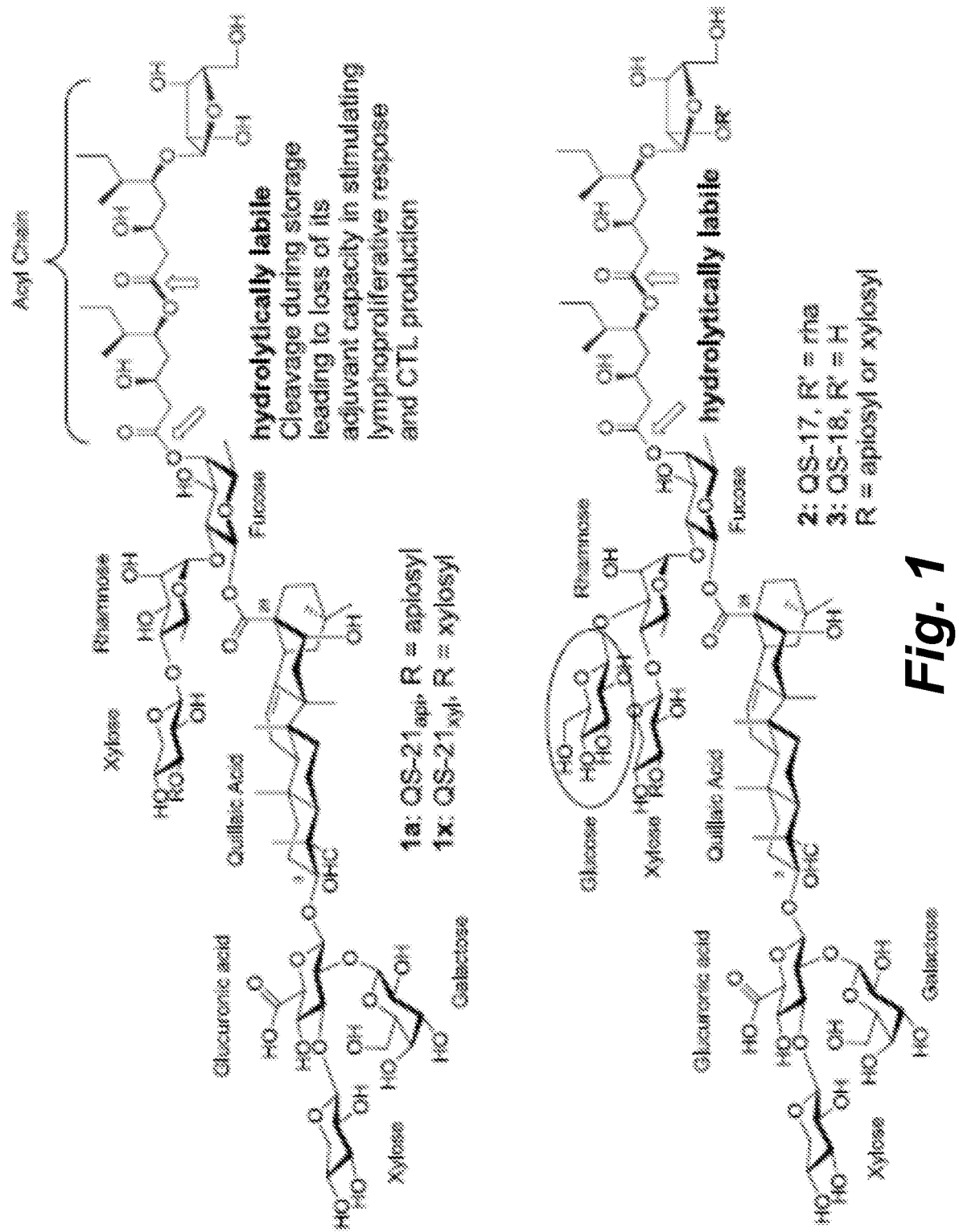
FIG. 1 illustrates natural saponin adjuvants QS-21, QS-17, and QS-18.

This disclosure is not limited to particular embodiments described, and as such may, of course, vary. The terminology used herein serves the purpose of describing particular embodiments only, and is not intended to be limiting, since the scope of the present disclosure will be limited only by the appended claims.

Where a range of values is provided, each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Embodiments of the present disclosure will employ, unless otherwise indicated, techniques of medicine, organic chemistry, biochemistry, molecular biology, pharmacology, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, dimensions, frequency ranges, applications, or the like, as such can vary. It is also to be understood that the terminology used herein is for purposes of describing particular embodiments only, and is not intended to be limiting. It is also possible in the present disclosure that steps can be executed in different sequence, where this is logically possible. It is also possible that the embodiments of the present disclosure can be applied to additional embodiments involving measurements beyond the examples described herein, which are not intended to be limiting. It is furthermore possible that the embodiments of the present disclosure can be combined or integrated with other measurement techniques beyond the examples described herein, which are not intended to be limiting.

It should be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Each of the applications and patents cited in this text, as well as each document or reference cited in each of the applications and patents (including during the prosecution of each issued patent; "application cited documents"), and each of the PCT and foreign applications or patents corresponding to and/or claiming priority from any of these applications and patents, and each of the documents cited or referenced in each of the application cited documents, are hereby expressly incorporated herein by reference. Further, documents or references cited in this text, in a Reference List before the claims, or in the text itself; and each of these documents or references ("herein cited references"), as well as each document or reference cited in each of the herein-cited references (including any manufacturer's specifications, instructions, etc.) are hereby expressly incorporated herein by reference.

Prior to describing the various embodiments, the following definitions are provided and should be used unless otherwise indicated.

Definitions

The term "acyl" as used herein, alone or in combination, means a carbonyl or thiocarbonyl group bonded to a radical selected from, for example, optionally substituted, hydrido, alkyl (e.g. haloalkyl), alkenyl, alkynyl, alkoxy ("acyloxy" including acetyloxy, butyryloxy, iso-valeryloxy, phenylacetyloxy, berizoyloxy, p-methoxybenzoyloxy, and substituted acyloxy such as alkoxyalkyl and haloalkoxy), aryl, halo, heterocyclyl, heteroaryl, sulfonyl (e.g. allylsulfinylalkyl), sulfonyl (e.g. alkylsulfonylalkyl), cycloalkyl, cycloalkenyl, thioalkyl, thioaryl, amino (e.g alkylamino or dialkylamino), and aralkoxy. Illustrative examples of "acyl" radicals are formyl, acetyl, 2-chloroacetyl, 2-bromacetyl, benzoyl, trifluoroacetyl, phthaloyl, malonyl, nicotinyl, and the like. The term "acyl" as used herein refers to a group —C(O)$R_{26}$, where $R_{26}$ is hydrogen, alkyl, cycloalkyl, cycloheteroalkyl, aryl, arylalkyl, heteroalkyl, heteroaryl, and heteroarylalkyl. Examples include, but are not limited to formyl, acetyl, cyclohexylcarbonyl, cyclohexylmethylcarbonyl, benzoyl, beozylcarbonyl and the like.

The terms "administering" and "administration" as used herein refer to introducing a composition (e.g., a vaccine, adjuvant, or immunogenic composition) of the present disclosure into a subject. A preferred route of administration of the vaccine composition is intravenous.

The terms "alkoxyl" or "alkoxyalkyl" as used herein refer to an alkyl-O— group wherein alkyl is as previously described. The term "alkoxyl" as used herein can refer to 01-20 inclusive, linear, branched, or cyclic, saturated or unsaturated oxo-hydrocarbon chains, including, for example, methoxyl, ethoxyl, propoxyl, isopropoxyl, butoxyl, t-butoxyl, and pentoxyl.

The term "acetonide" as used herein refers to an acetonide is the functional group composed of the cyclic ketal of a diol with acetone. The more systematic name for this structure is an isopropylidene ketal. Acetonide is a common protecting group for 1,2- and 1,3-diols. The protecting group can be removed by hydrolysis of the ketal using dilute aqueous acid.

The term "alkyl", either alone or within other terms such as "thioalkyl" and "arylalkyl", as used herein, means a monovalent, saturated hydrocarbon radical which may be a straight chain (i.e. linear) or a branched chain. An alkyl radical for use in the present disclosure generally comprises from about 1 to 20 carbon atoms, particularly from about 1 to 10, 1 to 8 or 1 to 7, more particularly about 1 to 6 carbon atoms, or 3 to 6. Illustrative alkyl radicals include methyl, ethyl, n-propyl, n-butyl, n-pentyl, n-hexyl, isopropyl, isobutyl, isopentyl, amyl, sec-butyl, tert-butyl, tert-pentyl, n-heptyl, n-actyl, n-nonyl, n-decyl, undecyl, n-dodecyl, n-tetradecyl, pentadecyl, n-hexadecyl, heptadecyl, n-octadecyl, nonadecyl, eicosyl, dosyl, n-tetracosyl, and the like, along with branched variations thereof. In certain aspects of the disclosure an alkyl radical is a $C_1$-$0_6$ lower alkyl comprising or selected from the group consisting of methyl, ethyl, n-propyl, n-butyl, n-pentyl, n-hexyl, isopropyl, isobutyl, isopentyl, amyl, tributyl, sec-butyl, tert-butyl, tert-pentyl, and n-hexyl. An alkyl radical may be optionally substituted with substituents as defined herein at positions that do not significantly interfere with the preparation of compounds of the disclosure and do not significantly reduce the efficacy of the compounds. In certain aspects of the disclosure, an alkyl radical is substituted with one to five substituents including halo, lower alkoxy, lower aliphatic, a substituted lower aliphatic, hydroxy, cyano, nitro, thio, amino, keto, aldehyde, ester, amide, substituted amino, carboxyl, sulfonyl, sulfuryl, sulfenyl, sulfate, sulfoxide, substituted carboxyl, halogenated lower alkyl (e.g. $CF_3$), halogenated lower alkoxy, hydroxycarbonyl, lower alkoxycarbonyl, lower alkylcarbonyloxy, lower alkylcarbonylamino, cycloaliphatic, substituted cycloaliphatic, or aryl (e.g., phenylmethyl benzyl)), heteroaryl (e.g., pyridyl), and heterocyclic (e.g., piperidinyl, morpholinyl). Substituents on an alkyl group may themselves be substituted.

The term "cyclic ketal ring" as used herein refers to an acetal in which the acetal carbon and one or both oxygen atoms are members of a ring.

The term "cyclic carbonate ester" as used herein refers to a carbonate ester i.e an ester of carbonic acid consisting of a carbonyl group flanked by two alkoxy groups. A carbonate group with two simple, identical substituents where the substituents are aliphatic are called dialkyl carbonates. The carbonate groups can be linked by a 2- or 3-carbon bridge, forming cyclic compounds such as ethylene carbonate and trimethylene carbonate The term "protecting group" refers to any chemical moiety that may be attached to a compound, including an intermediary compound in a reaction, thereby preventing undesirable modification of the structure to which the protecting group is attached. Their introduction and removal are described, for example, in "Protective Groups in Organic Synthesis", T. W. Greene et al., John Wiley & Sons Inc., Second Edition 1991. Suitable protecting group donor compounds, e.g. amino group protecting agents, are well-known to a skilled person and may include, but are not limited to, anhydrides, halides, carbamates or N-hydroxysuccinimides, carboxybenyl, and methoxy (MeO). It will be recognized that it may be preferred or necessary to prepare such a compound in which a functional group is protected using a conventional protecting group, then to remove the protecting group, to provide a compound of the present disclosure. The details concerning the use of protecting groups in accordance with the present invention are known to those skilled in the art.

The term "pharmaceutically acceptable" as used herein refers to a compound or combination of compounds that while biologically active will not damage the physiology of the recipient human or animal to the extent that the viability of the recipient is comprised. Preferably, the administered compound or combination of compounds will elicit, at most, a temporary detrimental effect on the health of the recipient human or animal is reduced.

The term "pharmaceutically acceptable carrier" as used herein refers to a diluent, adjuvant, excipient, or vehicle with which a probe of the disclosure is administered and which is approved by a regulatory agency of the Federal or a state government or listed in the U.S. Pharmacopeia or other generally recognized pharmacopeia for use in animals, and more particularly in humans. Such pharmaceutical carriers can be liquids, such as water and oils, including those of petroleum, animal, vegetable or synthetic origin, such as peanut oil, soybean oil, mineral oil, sesame oil and the like. The pharmaceutical carriers can be saline, gum acacia, gelatin, starch paste, talc, keratin, colloidal silica, urea, and the like. When administered to a patient, the composition of the disclosure and pharmaceutically acceptable carriers can be sterile. Water is a useful carrier when the probe is administered intravenously. Saline solutions and aqueous dextrose and glycerol solutions can also be employed as liquid carriers, particularly for injectable solutions. Suitable pharmaceutical carriers also include excipients such as glucose, lactose, sucrose, glycerol monostearate, sodium chloride, glycerol, propylene, glycol, water, ethanol and the like. The present compositions, if desired, can also contain minor amounts of wetting or emulsifying agents, or pH buffering agents. The present compositions advantageously may take the form of solutions, emulsion, sustained-release formulations, or any other form suitable for use.

The term "antibody" as used herein refers to polyclonal and monoclonal antibody preparations, as well as preparations including hybrid antibodies, altered antibodies, F(ab')$_2$ fragments, F(ab) fragments, Fv fragments, single domain antibodies, chimeric antibodies, humanized antibodies, and functional fragments thereof which exhibit immunological binding properties of the parent antibody molecule. Antibodies may include a complete immunoglobulin or fragment thereof, which immunoglobulins include the various classes and isotypes, such as IgA, IgD, IgE, IgG1, IgG2a, IgG2b and IgG3, IgM, IgY, etc. Fragments thereof may include Fab, Fv and F(ab')$_2$, Fab', scFv, and the like. In addition, aggregates, polymers, and conjugates of immunoglobulins or their fragments can be used where appropriate so long as binding affinity for a particular molecule is maintained.

The term "antibody" as used herein further refers to an immunoglobulin which specifically binds to and is thereby defined las complementary with a particular spatial and polar organization of another molecule. The antibody can be monoclonal, polyclonal, or a recombinant antibody, and can be prepared by techniques that are well known in the art such as immunization of a host and collection of sera (polyclonal) or by preparing continuous hybrid cell lines and collecting the secreted protein (monoclonal), or by cloning and expressing nucleotide sequences, or mutagenized versions thereof, coding at least for the amino acid sequences required for specific binding of natural antibodies.

The term "antigen" as used herein refers to a molecule with one or more epitopes that stimulate a host's immune system to make a secretory, humoral and/or cellular antigen-specific response, or to a DNA molecule that is capable of producing such an antigen in a vertebrate. The term is also used interchangeably with "immunogen." For example, a specific antigen can be complete protein, portions of a protein, peptides, fusion proteins, glycosylated proteins and combinations thereof.

The term "antigenic component" as used herein refers to a component derived from an organism capable of stimulating an immune response in an animal, preferably a mammal including mouse and human. An antigenic component may be an immunogenic agent. The antigenic component may comprise sub-cellular components including, organelles, membranes, proteins, lipids, glycoproteins and other components derived from the organism. The antigenic component may be derived from a whole organism, for example a whole parasite, or a part of an organism, for example a cell or tissue of an organism. Also, a sub-set of proteins may be purified, for example by size fractionation or affinity purification, and recombined.

The terms "sugar" and "saccharide" as used herein refers to a polyhydroxyaldehyde, polyhydroxyketone and derivatives thereof. The term includes monosaccharides such as erythrose, arabinose, allose, altrose, glucose, mannose, threose, xylose, gulose, idose, galactose, talose, aldohexose, fructose, ketohexose, ribose, and aldopentose. The term also includes carbohydrates composed of monosaccharide units, including disaccharides, oligosaccharides, or polysaccharides. Examples of disaccharides are sucrose, lactose, and maltose. Oligosaccharides generally contain between 3 and 9 monosaccharide its and polysaccharides contain greater than 10 monosaccharide units. A sugar may be a member of the D or L series and can include amino sugars, deoxy sugars, and their uronic acid derivatives. In embodiments of the disclosure where the carbohydrate is a hexose, the hexose is glucose, galactose, or mannose, or substituted hexose sugar residues such as an amino sugar residue such as hexosamine, galactosamine; glucosamine, in particular D-glucosamine (2-amino-2-doexy-D-gluoose) or D-galactosamine (2-amino-2-deoxy-D-galactose). Illustrative pentose sugars include arabinose, fucose, and ribose. A sugar residue may be linked to a compound of the disclosure from a 1,1 linkage, 1,2 linkage, 1,3 linkage, 1,4 linkage, 1,5 linkage, or 1,6 linkage. A linkage may be via an oxygen atom of a compound of the disclosure. An oxygen atom can be replaced one or more times by —CH$_2$— or —S— groups.

The term "carboxyl" as used herein, alone or in combination, refers to —C(O)OR wherein R is hydrogen, alkyl, alkenyl, alkynyl, cycloalkyl, cycloalkenyl, amino, thiol, aryl, heteroaryl, thioalkyl, thioaryl, thioalkoxy, a heteroaryl, or a heterocyclic, which may optionally be substituted. In aspects of the disclosure, the carboxyl groups are in an esterified form and may contain as an esterifying group lower alkyl groups. An esterified form is also particularly referred to herein as a "carboxylic ester". In aspects of the disclosure a "carboxyl" may be substituted, in particular substituted with allyl which is optionally substituted with one or more of amino, amine, halo, alkylamino, aryl, carboxyl, or a heterocyclic. Examples of carboxyl groups are methoxycarbonyl, butoxycarbonyl, tert.alkoxycarbonyl such as tert.butoxycarbonyl, arylmethyoxycarbonyl having one or two aryl radicals including without limitation phenyl optionally substituted by for example lower alkyl, lower alkoxy, hydroxyl, halo, and/or nitro, such as benzyloxycarbonyl, methoxybenzyloxycarbonyl, diphenyl methoxycarbonyl, 2-bromoethoxycarbonyl, 2-iodoethoxycarbonyltert-.butylcarborlyl, 4-nitrobenzyloxycarbonyl, diphenyl methoxy-carbonyl, benzhydroxycarbonyl, di-(4-methoxy-phenyl-methoxycarbonyl, 2-bromoethoxycarbonyl, 2-iodoethoxycarbonyl, 2-trimethylsilylethoxycarbonyl, or 2-triphenylsilylethoxycarbonyl. Additional carboxyl groups in esterified form are silyloxycarbonyl groups including organic silyloxycarbonyl. The silicon substituent in such compounds may be substituted with lower alkyl (e.g. methyl), alkoxy (e.g. methoxy), and/or halo (e.g. chlorine). Examples of silicon substituents include trimethylsilyi and dimethyltert.butylsilyl. In aspects of the disclosure, the carboxyl group may be an alkoxy carbonyl, in particular methoxy carbonyl, ethoxy carbonyl, isopropoxy carbonyl, t-butoxycarbonyl, t-pentyloxycarbonyl, sir heptyloxy carbonyl, especially methoxy carbonyl or ethoxy carbonyl.

The term "composition" as used herein refers to a product comprising the specified ingredients in the specified amounts, as well as any product which results, directly or indirectly, from combination of the specified ingredients in the specified amounts. Such a term in relation to a pharmaceutical composition is intended to encompass a product comprising the active ingredient(s), and the inert ingredient(s) that make up the carrier, as well as any product which results, directly or indirectly, from combination, complexation, or aggregation of any two or more of the ingredients, or from dissociation of one or more of the ingredients, or from other types of reactions or interactions of one or more of the ingredients. Accordingly, the pharmaceutical compositions of the present disclosure encompass any composition made by admixing a compound of the present disclosure and a pharmaceutically acceptable carrier.

When a compound of the present disclosure is used contemporaneously with one or more other drugs, a pharmaceutical composition containing such other drugs in addition to the compound of the present disclosure is contemplated. Accordingly, the pharmaceutical compositions of the present disclosure include those that also contain one or more other active ingredients, in addition to a compound of the present disclosure. The weight ratio of the compound of the present disclosure to the second active ingredient may be varied and will depend upon the effective dose of each ingredient. Generally, an effective dose of each will be used. Thus, for example, but not intended to be limiting, when a compound of the present disclosure is combined with another agent, the weight ratio of the compound of the present disclosure to the other agent will generally range from about 1000:1 to about 1:1000, preferably about 200:1 to about 1:200. Combinations of a compound of the present disclosure and other active ingredients will generally also be within the aforementioned range, but in each case, an effective dose of each active ingredient should be used. In such combinations the compound of the present disclosure and other active agents may be administered separately or in conjunction. In addition, the administration of one element may be prior to, concurrent to, or subsequent to the administration of other agent(s).

Compounds of the disclosure can be prepared using reactions and methods generally known to the person of ordinary skill in the art, having regard to that knowledge and the disclosure of this application including the Examples. The reactions are performed in solvent appropriate to the reagents and materials used and suitable for the reactions being effected. It will be understood by those skilled in the art of organic synthesis that the functionality present on the compounds should be consistent with the proposed reaction steps. This will sometimes require modification of the order of the synthetic steps or selection of one particular process scheme over another in order to obtain a desired compound of the disclosure. It will also be recognized that another major consideration in the development of a synthetic route is the selection of the protecting group used for protection of the reactive functional groups present in the compounds described in this disclosure. An authoritative account describing the many alternatives to the skilled artisan is Greene and Wuts (Protective Groups In Organic Synthesis, Wiley and Sons, 1991).

A compound of the disclosure may be formulated into a pharmaceutical composition for administration to a subject by appropriate methods known in the art. Pharmaceutical compositions of the present disclosure or fractions, thereof, comprise suitable pharmaceutically acceptable carriers, excipients, and vehicles selected based on the intended form of administration, and consistent with conventional pharmaceutical practices. Suitable pharmaceutical carriers, excipients, and vehicles are described in the standard text, Remington: The Science and Practice of Pharmacy (21.sup.st Edition. 2005, University of the Sciences in Philadelphia (Editor), Mack Publishing Company), and in The United States Pharmacopeia: The National Formulary (USP 24 NF19) published in 1999.

The term "immunogenic composition" as used herein are those which result in specific antibody production or in cellular immunity when injected into a host.

The immunogenic compositions and/or vaccines of the present disclosure may be formulated by any of the methods known in the art. They can be typically prepared as injectables or as formulations for intranasal administration, either as liquid solutions or suspensions. Solid forms suitable for solution in, or suspension in, liquid prior to injection or other administration may also be prepared. The preparation may also, for example, be emulsified, or the protein(s)/peptide(s) encapsulated in liposomes.

The active immunogenic ingredients are often mixed with excipients or carriers, which are pharmaceutically acceptable and compatible with the active ingredient. Suitable excipients include but are not limited to water, saline, dextrose, glycerol, ethanol, or the like and combinations thereof. The concentration of the immunogenic polypeptide in injectable, aerosol or nasal formulations is usually in the range of about 0.2 to 5 mg/ml. Similar dosages can be administered to other mucosal surfaces.

The term "vaccine" as used herein refers to an immunogenic amount of one or more antigens, fragment(s), or subunit(s) thereof. Such vaccines can include one or more immunogens and portions thereof, and adjuvant molecule, or in combination with another protein or other immunogen.

In addition, if desired, the vaccines may contain minor amounts of auxiliary substances such as wetting or emulsifying agents, pH buffering agents, and/or other agents, which enhance the effectiveness of the vaccine. Examples of agents which may be effective include, but are not limited to, aluminum hydroxide; N-acetyl-muramyl-L-threonyl-D-isoglutamine (thr-MDP); N-acetyl-nor-muramyl-L-alanyl-D-isoglutamine (CGP 11637, referred to as nor-MDP); N-acetylmuramyl-L-alanyl-D-isoglutaminyl-L-alanine-2-(1'-2'-dipalmitoyl-sn-glycero-3-hydroxyphosphoryloxy)-ethylamine (CGP 19835A, referred to as MTP-PE); and RIBI, which contains three components extracted from bacteria: monophosphoryl lipid A, trehalose dimycolate and cell wall skeleton (MPL+TDM+CWS) in a 2% squalene/Tween 80 emulsion. The effectiveness of the auxiliary substances may be determined by measuring the amount of antibodies (especially IgG, IgM or IgA) directed against the immunogen resulting from administration of the immunogen in vaccines which comprise the adjuvant in question. Additional formulations and modes of administration may also be used.

The immunogenic compositions and/or vaccines of the present disclosure can be administered in a manner compatible with the dosage formulation and in such amount and manner as will be prophylactically and/or therapeutically effective, according to what is known to the art. The quantity to be administered depends on the nature of the antigen and/or adjuvant molecule, subject to be treated, the capacity of the host's immune system to synthesize antibodies, and the degree of protection desired. Precise amounts of the active ingredient required to be administered may depend on the judgment of the physician or veterinarian and may be peculiar to each individual, but such a determination is within the skill of such a practitioner.

The vaccine or immunogenic composition may be given in a single dose; two-dose schedule, for example, two to eight weeks apart; or a multi-dose schedule. A multi-dose schedule is one in which a primary course of vaccination may include 1 to 10 or more separate doses, followed by other doses administered at subsequent time intervals as required to maintain and/or reinforce the immune response (e.g., at 1 to 4 months for a second dose, and if needed, a subsequent dose(s) after several months).

The term "immunogenic fragment" as used herein refers to a fragment of an immunogen that includes one or more epitopes and thus can modulate an immune response or can act as an adjuvant for a co-administered antigen. Such fragments can be identified using any number of epitope mapping techniques, well known in the art (see, e.g., Epitope Mapping Protocols in Methods in Molecular Biology, Vol. 66 (Morris, G. E., Ed., 1996) Humana Press, Totowa, NJ).

Immunogenic fragments can be at least about 2 amino acids in length, more preferably about 5 amino acids in length, and most preferably at least about 10 to about 15 amino acids in length. There is no critical upper limit to the length of the fragment, which can comprise nearly the full-length of the protein sequence or even a fusion protein comprising two or more epitopes.

The term "immunological response" as used herein refers to the development in a subject of a humoral and/or a cellular immune response to an antigen present in the composition of interest. For purposes of the present disclosure, a "humoral immune response" refers to an immune response mediated by antibody molecules, while a "cellular immune response" is one mediated by T-lymphocytes and/or other white blood cells.

One aspect of cellular immunity involves an antigen-specific response by cytolytic T-cells ("CTL"s). CTLs have specificity for peptide antigens that are presented in association with proteins encoded by the major histocompatibility complex (MHC) and expressed on the surfaces of cells. CTLs help induce and promote the destruction of intracellular microbes or the lysis of cells infected with such microbes. Another aspect of cellular immunity involves an antigen-specific response by helper T-cells. Helper T-cells act to help stimulate the function, and focus the activity of, nonspecific effector cells against cells displaying peptide antigens in association with MHC molecules on their surface. A "cellular immune response" also refers to the production of cytokines, hemokines and other such molecules produced by activated T-cells and/or other white blood cells, including those derived from CD4+ and CD8+ T-cells. Hence, an immunological response may include one or more of the following effects: the production of antibodies by B-cells; and/or the activation of suppressor T-cells and/or γδ T-cells directed specifically to an antigen or antigens present in the composition or vaccine of interest. These responses may serve to neutralize infectivity, and/or mediate antibody-complement, or antibody dependent cell cytotoxicity (ADCC) to provide protection to an immunized host. Such responses can be determined using standard immunoassays and neutralization assays, well known in the art.

The term "immunogenic amount" as used herein refers to an amount capable of eliciting the production of antibodies directed against the virus in the host to which the vaccine has been administered.

The term "immunopotentiator," as used herein, is intended to mean a substance that, when mixed with an immunogen, elicits a greater immune response than the immunogen alone. For example, an immunopotentiator can enhance immunogenicity and provide a superior immune response. An immunopotentiator can act, for example, by enhancing the expression of co-stimulators on macrophages and other antigen-presenting cells.

The terms "subject", "individual", or "patient" as used herein are used interchangeably and refer to an animal preferably a warm-blooded animal such as a mammal. Mammal includes without limitation any members of the Mammalia. A mammal, as a subject or patient in the present disclosure, can be from the family of Primates, Carnivora, Proboscidea, Perissodactyla, Artiodactyla, Rodentia, and Lagomorpha. In a particular embodiment, the mammal is a human. In other embodiments, animals can be treated; the animals can be vertebrates, including both birds and mammals. In aspects of the disclosure, the terms include domestic animals bred for food or as pets, including equines, bovines, sheep, poultry, fish, porcines, canines, felines, and zoo animals, goats, apes (e.g. gorilla or chimpanzee), and rodents such as rats and mice.

The saponin for purposes of the present disclosure can be any selected from the class of saponins. Generally, saponins are a class of chemical compounds found in particular abundance in various plant species. They are amphipathic glycosides grouped phenomenologically by the soap-like foaming they produce when shaken in aqueous solutions, and structurally by having one or more hydrophilic glycoside moieties combined with a lipophilic triterpene derivative. In preferred embodiments, the saponin of the disclosure are non-natural synthesized derivatives that are purified or semi-purified and lyophilized.

A saponin preparation isolated from the South American tree Quillaja saponaria Molina was first described by Dalsgaard et al. in 1974 ("Saponin adjuvants", Archiv. fur die gesamte Virusforschung, Vol. 44, Springer Verlag, Berlin, p 243-254) to have adjuvant activity. Purified fragments of Quil A have been isolated by HPLC which retain adjuvant activity without the toxicity associated with Quil A (EP 0 362 278), for example QS7 and QS21 (also known as QA7 and QA21). QS-21 is a natural saponin derived from the bark of Quillaja saponaria Molina, that induces CD8+ cytotoxic T cells (CTLs), Th1 cells and a predominant IgG2a antibody response.

Saponins of the disclosure can be used at amounts between 1 and 100 μg per human dose of the adjuvant composition, at a level of about 50 μg, for example between 40 to 60 μg, suitably between 45 to 55 μg or between 49 and 51 μg or 50 μg. In some embodiments, a human dose of the adjuvant composition can comprise QS21 at a level of about 25 μg, for example between 20 to 30 μg, suitably between 21 to 29 μg or between 22 to 28 μg or between 28 and 27 μg or between 24 and 26 μg, or 25 μg.

When the adjuvant is to be combined with a liquid form of an antigenic composition, the adjuvant composition will be in a human dose suitable volume which is approximately half of the intended final volume of the human dose. For example a 500 μl volume of adjuvant for an intended final human dose of 1 μl, or a 250 μl volume for an intended final human dose of 0.5 ml. The adjuvant composition is diluted when combined with the antigen composition to provide the final human dose of vaccine. The final volume of such dose will of course vary dependent on the initial volume of the adjuvant composition and the volume of antigen composition added to the adjuvant composition. In an alternative embodiment, the aqueous adjuvant is used to reconstitute a lyophilised antigen composition. In this embodiment, the human dose suitable volume of the adjuvant composition is approximately equal to the final volume of the human dose. The liquid adjuvant composition is added to the vial containing the lyophilised antigen composition and used to reconstitute the lyophilised antigen composition.

In embodiments, the saponin is present in the adjuvant composition of the present disclosure in an amount of about 0.0001% to about 0.5%, where values such as 0.0001%, 0.0002%, 0.0005%, 0.0007%, 0.0008%, 0.00085%. 0.0009%, 0.00095%, 0.00099%, 0.001%, 0.002%, 0.003%, 0.004%, 0.005%, 0.006%. 0.007%, 0.008%, 0.009%, 0.01%, 0.015%, 0.02%, 0.025%, 0.03%, 0.035%, 0.04%, 0.045%, 0.05%, 0.06%, 0.07%, 0.08%, 0.09%, 0.1%, 0.15%, 0.2%, 0.25%, 0.3%, 0.35%, 0.4%, 0.45% and 0.5% are envisioned. Further, ranges including any two discreet values described above are also envisioned. For example, the saponin may be present in the adjuvant composition of the present disclosure in an amount from about 0.001% to 0.003%, 0.003% to 0.01%, 0.003% to 0.05%, 0.01% to 0.03%, 0.1%, to 0.5%, 0.07% to 0.2%, and the like.

The adjuvant composition of the present disclosure can further comprise a component that neutralizes the pH of the composition to a pH from about 6-8. Any conventional neutralizer can be used such as, but not limited to, the neutralizer is selected from the group consisting of sodium hydroxide, potassium hydroxide, and ammonium hydroxide. In some embodiments, the component that neutralizes the pH of the solution can be sodium hydroxide. The component that neutralizes the pH of the adjuvant composition can be present in an amount of about 0.1% to 10%, where values such as 0.1%, 0.2%, 0.3%, 0.4%, 0.5%, 0.6%, 0.7%, 0.8%, 0.9%, 1%, 1.25%, 1.5%, 1.75%, 2%, 2.25%, 2.5%, 2.75%, 3%, 3.25%, 3.5%, 3.75%, 4%, 4.25%, 4.5%, 4.75%, 5%, 5.25%, 5.5%, 5.75%, 6%, 6.25%, 6.5%, 6.75%, 7%, 7.25%, 7.5%, 7.75%, 8%, 8.25%, 8.5%, 8.75%, 9%, 9.25%, 9.5%, 9.75%, and 10% are envisioned. Additionally, any range incorporating two of these values is also envisioned including, but not limited to 2% to 8%, 2% to 6%, 3% to 8%, 4% to 6%, 1.5%, 2%, 2.5%, 3%, 3.5%, 4%, 4.5%, 5%, 5.5%, 6%, 6.5%, 7%, 7.5%, 8%, 8.5%, 9%, and 9.5% are envisioned. In a most preferred embodiment, the component that neutralizes the pH of the adjuvant composition is present in an amount of about 5% by volume.

The adjuvant compositions of the present disclosure can form emulsions that form particles that are 10 nm to 2000 nm in diameter as measured by microscopy or by particle counters. The particle size can be 80 nm to 500 nm to allow processing by antigen presenting cells in the recipient.

The adjuvant composition of the present disclosure can be shelf stable for at least 6 months, more preferably at least 12 months, still more preferably at least 18 months, and even more preferably at least 24 months or longer. The stability refers to the ability to keep biophysical and efficacy features after incubation for long periods of time at either room temperature (about 18° C. to about 30° C.) and in refrigerated temperatures (2° C. to about 7° C.). The adjuvant compositions of the disclosure can also be frozen (about-18° C. to about –22° C.; –40° C. to about –85° C. or freeze dried and stored at refrigerated temperatures (about 2° C. to about 7° C.) and when resuspended after being freeze dried.

The present disclosure also provides for a vaccine composition or immunogenic composition. The vaccine or immunogenic composition can comprise the adjuvant compositions of the present disclosure and an antigen(s). The amount of the adjuvant composition of the present disclosure and the amount of antigen, as well as the antigen production technology depend on the administration method selected. Those of skill in the art will be able to determine the appropriate ratio for such administration methods. The adjuvant composition can be present in an amount of from about 1% to 30%, by volume, of the total volume of the vaccine composition, where values and ranges such as 1% to 25%, 1% to 20%, 1% to 15%, 15% to 30%, 10% to 20%, 10% to 25%, 10% to 20%, 15% to 25%, 20% to 30%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, and 30% are envisioned.

The present disclosure also provides for a method of eliciting an immune response in a human or animal subject, where the steps of the method comprise vaccinating the subject at least a single time with the vaccine or immunogenic composition of the present disclosure. Subsequent doses of vaccine are also envisioned, where the vaccine composition may be administered two, three, four, or five times.

The antigenic moiety making up the vaccine or immunogenic composition can be either a modified-live or killed microorganism, or a natural product purified from a microorganism or other cell including, but not limited to, tumor cell, a synthetic product, a genetically engineered protein, peptide, polysaccharide or similar product, or an allergen.

The antigenic moiety can also be a subunit of a protein, peptide, polysaccharide or similar product. The antigen may also be the genetic antigens, i.e., the DNA or RNA that engenders or induces an immune response. Representative of the antigens that can be used according to the present disclosure include, but are not limited to, natural, recombinant or synthetic products derived from viruses, bacteria, fungi, parasites and other infectious agents in addition to autoimmune diseases, hormones, or tumor antigens which might be used in prophylactic or therapeutic vaccines and allergens. The viral or bacterial products can be components which the organism produced by enzymatic cleavage or can be components of the organism that were produced by recombinant DNA techniques that are well known to those of ordinary skill in the art. Because of the nature of the disclosure and its mode of delivery it is very conceivable that the disclosure would also function as a delivery system for drugs, such as hormones, antibiotics and antivirals. As understood by those of skill in the art and the usefulness of a vaccine with any type of antigen, all variations of the antigen including whole organisms, macromolecules, subunits, nucleic acids, expressed proteins, and combinations thereof are contemplated by the present disclosure.

The method of vaccinating of the present disclosure can includes administration of the composition comprising the adjuvant of the present disclosure and an antigen, where administration is needleless or injected. In one embodiment, the administration method is selected from the group consisting of topical, intramuscular, nasal, oral, transdermal, mucosal, needless administration methods and subcutaneous. Needleless administration methods include, but are not limited to, vaccine guns, transdermal patches, aerosols, mucosal administration methods, skin adhesion methods, dry particle projectiles, wet projectiles, gold/inert particle guns, and pneumatic guns.

Abbreviations

MPL, monophosphoryl lipid A; PamCys, dipalmitoyl-S-glyceryl cysteine; tBU, tert-butyl; iPr, ios-propyl; Bn, benzyl; RP-HPLC, reverse phase high pressure liquid chromatography; SAR, structure activity relationship Discussion Recent research results indicate that the underexplored QS-17 and QS-18, the two characterized components of QS extract with promising adjuvant activity, are potential leads in developing a new class of structurally defined synthetic vaccine adjuvants. Due to the structural complexity and difficulty in preparation, de novo synthesis and immunological study of structurally defined pure QS-17/18 analogs has been unexplored. The disclosure now provides embodiments of protocols to synthesize a series of novel QS-17/18-based adjuvants. A glycosylation approach for step-economical carbohydrate synthesis has been developed to improve the overall synthetic efficiency and represents a step toward developing structurally defined and clinically relevant adjuvants with enhanced adjuvant activity, reduced toxicity, and much improved chemical stability and synthetic accessibility.

It has been shown that for QS-21-based vaccine adjuvants (a) derivatizing at the west wing of the saponin skeleton (i.e., at the glucuronic acid unit of the branched trisaccharide domain) is a viable way to access new saponin adjuvants with adjuvanticity and toxicity profiles different from known natural and unnatural QS products; (b) the structure of the side chain has a significant impact on adjuvant activity in terms of magnitude and nature of the immune responses; and (c) derivatizing QS-17/18 at the glucuronic acid unit of the branched trisaccharide domain is a direction toward adjuvants with preferable adjuvanticity and toxicity profiles. Development of defined QS-17/18 analogs as synthetic vaccine adjuvants is clinically relevant: Defined synthetic adjuvants are crucial to structure-activity-relationship (SAR) studies and as molecular probes for studying the mechanisms underlying adjuvanticity at the molecular level. Progress has been made in this direction by recent efforts to uncover new details of QS-21's poorly understood action mechanism. Reliable mechanistic and SAR insights, in return, provide a rationale for developing new vaccine adjuvants and vaccine formulations.

A series of novel QS-17/18-based vaccine adjuvants with a different side chain connected to the glucuronic acid unit of the branched trisaccharide domain were synthesized in a divergent manner as a step toward the identification of structurally defined adjuvants with better adjuvanticity and lower toxicity than the currently available natural and unnatural QS saponin products.

Naturally occurred and underexplored QS-17 and QS-18 can be used as synthetic vaccine adjuvants: Naturally occurring saponins can be useful lead compounds as the first step toward development of structurally defined synthetic vaccine adjuvants. Among various vaccine adjuvants studied, QS-21 (1, FIG. 1), a saponin adjuvant isolated from the tree bark of Quillaja saponaria (QS) Molina, stimulates mixed Th1 and Th2 responses. It has outperformed other classes of adjuvants and been evaluated in over 100 clinical trials of vaccines against cancer and infectious diseases (Ragupathi et al., (2011) *Expert Rev Vaccines*. 10:463-470).

QS-21 is a mixture of two isomers (FIGs. 1, 1a and 1x in a ratio of 2:1) with the same adjuvanticity and toxicity (Deng et al., (2008) *Angew Chem. Int. Ed.* 47 6395-6398; Kensil C. R., (1996). *Critical Revs. Therapeut. Drug Carrier Systems* 13: 1-55; Kensil et al., (1991) *J. Immun.* 146: 431-437; Ragupathi et al., (2010) *Vaccine*. 28: 4260-4267; Wang et al., (2005) *J. Am. Chem. Soc.* 127: 3256-3257). However, the natural saponin QS-21 has its inherent drawbacks such as chemical instability, limited supply, difficult and low-yielding purification, and dose-limiting toxicity, which are the hurdles to its wider use. There remains an imperative need for structurally-defined new QS saponin-based adjuvants with enhanced adjuvant activity, reduced toxicity, simplified formulation, and improved chemical stability and synthetic accessibility (Deng et al., (2008) *Angew Chem. Int. Ed.* 47(34) 6395-6398, Ragupathi et al., (2010) *Vaccine*. 28: 4260-4267; Wang et al., (2005) *J. Am. Chem. Soc.* 127: 3256-3257; Adams et al., (2010) *J. Am. Chem. Soc.* 132: 1939-1945; Chea et al., (2012) *J. Am. Chem. Soc.* 134: 13448-13457; Fernandez-Tejada et al., (2014) *Nat. Chem.* 6: 635-643). While developing QS-21-based vaccine adjuvants results suggest that QS-17 (2) and QS-18 (3) can be useful for developing structurally defined vaccine adjuvants for human use.

QS-17/18 are among the major adjuvant-active fractions from the QS Molina tree bark in addition to QS-21 (1) (Kensil C R, (1996). *Critical Revs. Therapeut. Drug Carrier Systems* 13: 1-55; Kensil et al., (1991) *J. Immun.* 146: 431-437); QS-18 (3) is more abundant than QS-21 (1) and other identified fractions. The structural difference between QS-21 and QS-17/18 is in the east wing oligosaccharide domain, i.e., instead of having a linear tetrasaccharide as in QS-21, QS-17/18 has an additional glucose unit connected to the rhamnose unit (circled in 2 and 3, FIG. 1). QS-17 differs from QS-18 only in the acyl side chain (i.e., R') and they become identical after removal of the side chain. The lipophilic acyl chain of QS-17, QS-18, and QS-21 is important to their adjuvanticity, and it is also associated with their toxicity and instability under physiological conditions.

QS-17/18 derivatives are the major component of the semi-synthetic saponin mixture GPI-0100 which is prepared in two steps from commercially available quillaja saponins containing QS-17/18, QS-21, and many other as yet unidentified saponins. GPI-0100 retains the capacity of stimulating humoral as well as T-cell immunity with the production of antigen-specific CTL. Although its immune stimulatory activity is lower than that of the natural saponins, toxicology studies indicated that GPI-0100 is 20 times less lethal in mice than QS-21, which allows the GPI-0100 dose to be significantly increased to achieve the desired immune response without early onset of toxicity (Slovin et al., (2005) *Vaccine*. 23: 3114-3122).

Figure 3:
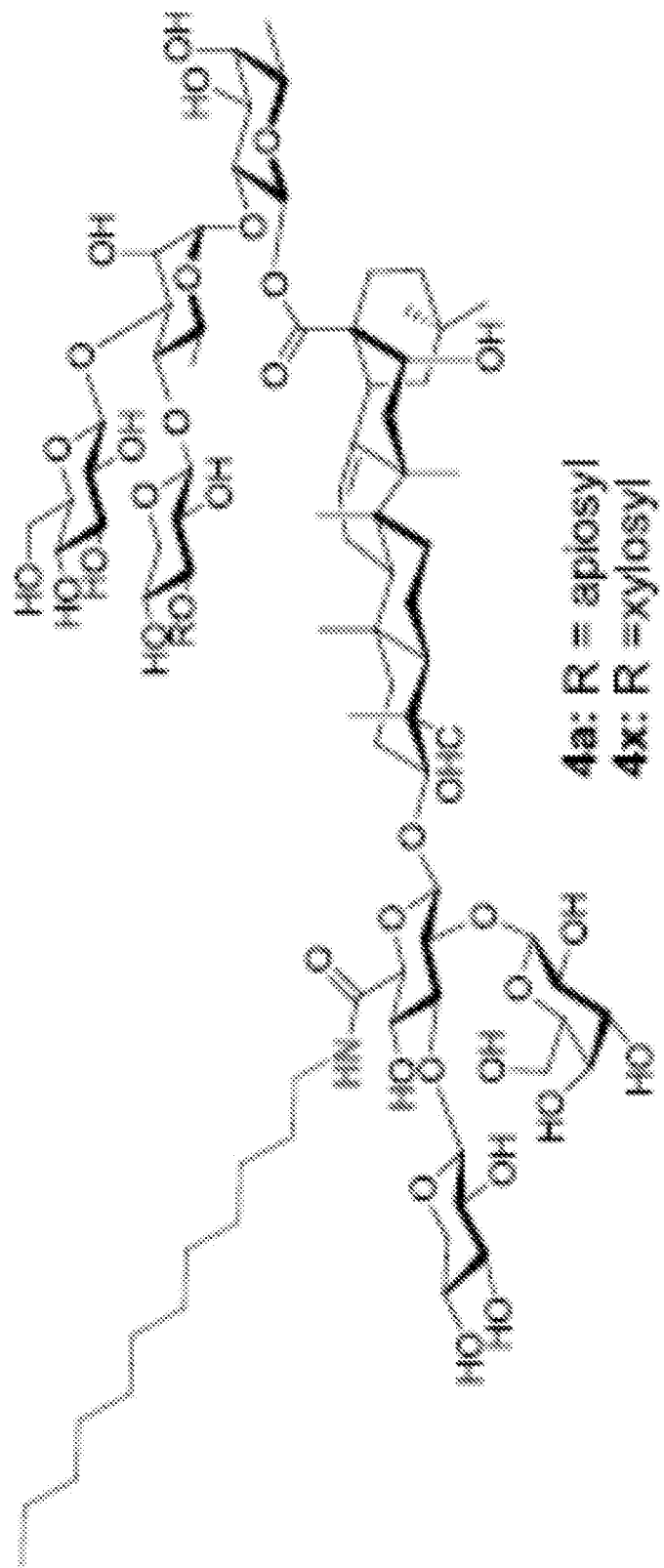
FIG. 3 illustrates synthetic saponin adjuvants 4a and 4x (4x=A).

De novo synthesis of QS-17/18 and their unnatural (artificial) analogs has never been documented. Consequently, immunological study of structurally defined pure QS-17/18 derivatives remained unexplored despite their adjuvant potentials. For example, QS-17/18 analogs described in the present disclosure are the analogs 4a and 4x (FIG. 3). They are likely the key active components of GPI-0100 based on composition of the starting materials and chemistry of GPI-0100 preparation, and LC-MS analysis of the reaction products (Marciani et al., (2003) *Vaccine*. 21: 3961-3971). However, their isolation from GPI-0100 is a formidable task; chemical synthesis is the only practical way to access them in the pure form.

Since the structure of the side chain has a significant impact on adjuvant activity QS-17/18 analogs were synthesized with different side chains for SAR studies in pursuit of QS-17/18-based adjuvants. The designed analogs can be chemically more stable than the corresponding products isolated from nature because the labile natural acyl side chain is replaced with a stable amide side chain. With the divergent synthetic strategy and the efficient glycosylation approach (Wang et al., (2013) *J. Org. Chem.* 78: 11525-115341, Wang et al., (2007) *J. Org. Chem.* 72: 5870-5873; Wang et al., (2011) *Tetrahedron Lett.* 52: 3912-3915; Wang et al., (2010) *Org. Biomol. Chem.* 8: 4322-4328; Yang et al., (2013) *J. Org. Chem.* 78: 1858-1863), five structurally defined and pure QS-21 analogs were prepared in sufficient quantities for their immunological evaluations Adjuvants with different side chain through divergent synthesis: Derivatisation of the carboxylic group of the west wing glucuronic acid unit allows for maintaining adjuvant activity of QS-21 analogs (Soltysik et al., (1995) *Vaccine*. 13: 1403-1410). The structure of the incorporated side chain has a significant impact on adjuvant activity in terms of magnitude and nature of the responses. Therefore, different side chains (other than the dodecyl amide group) can be incorporated into the main frame of synthetic analogs through divergent synthesis from the key intermediate 17. Thus, by simply coupling the amino group of the side chain with the carboxyl group of the glucuronic acid in 17 followed by global deprotection, a variety of new adjuvants could be conveniently prepared. Among various side chains, chains a-d (FIG. 4) were examined.

Figure 4:
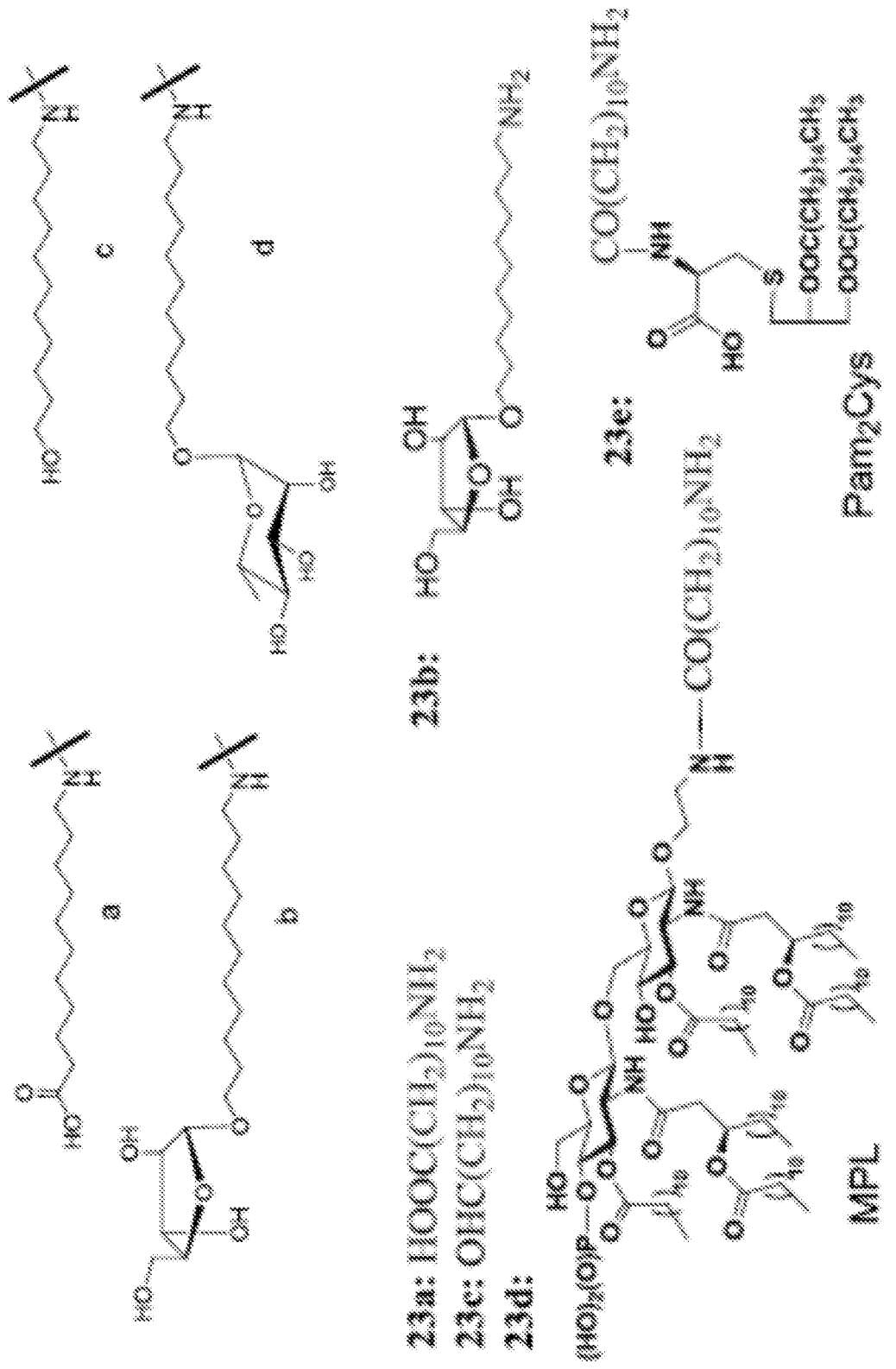
FIG. 4 illustrates some possible side-chains of the modified saponins of the disclsoure.

Preliminary studies showed that it is desirable to have a plain aliphatic chain without internal functionality. Therefore, those side chains with a terminal functional group only, as in a-d were first examined. The chains a and b were used in the QS-21 analogs 6 and 7, respectively. Their role in affecting adjuvanticity could be tested in the new QS-17/18 series of analogs. It was also investigated (i) how a terminal hydroxyl group (as in the chain c) would affect adjuvant property (a versus c); and (ii) whether the structure of the terminal sugar unit has an impact (b versus d). Other aspects of the side chain effect studied were, for example, how the adjuvanticity would be affected by the adjuvant's hydrophilicity/hydrophobicity balance through adjusting the length of un-functionalized aliphatic chain, and whether an aliphatic chain terminally-functionalized with a carbonyl group or a specific oligosaccharide could enhance co-stimulatory signaling (Soltysik et al., (1995) *Vaccine*. 13: 1403-1410, Rhodes J., (1996) *Immun. Today*. 17(9): 436-441) or targeting to antigen-presenting cell (Cox J C and Coulter A R, (1997) *Vaccine*. 15: 248-256). *Immunological evaluation*: The adjuvant activity and toxicity of structure 4 and those with different side chains (as shown in FIG. 4) could be compared against that of the commercially available GPI-0100. To investigate potential additive or synergistic effect, the combination of 4 with QS-21-based analogs 5 (mimicking GPI-0100) could also be evaluated for their ability to potentiate the immune response to a recombinant microbial protein. The two vaccines that used GPI-0100 as the adjuvant used recombinant antigens from *Francisella tularensis*, the cause of tularemia and a category A select agent, and from *Porphyromonas gingivalis*, an etiologic agent of periodontal disease. Recombinant heat shock protein DnaK from *F. tularensis* (Ashtekar et al., (2008) *J. Leukoc. Biol*. 84: 1434-1446) had low immunogenicity if given alone, but induced good responses when given with GPI-0100 by the intranasal (i.n.) route that provided some protection against a lethal respiratory challenge with *F. tularensis* (Ashtekar et al., (2012) *PloS one*. 7 (11): e50460).

Immunological studies with the recombinant, non-fimbrial adhesion hemagglutinin B (HagB) from *P. gingivalis* (Zhang et al., (2003) *Vaccine*. 21(27-30): 4459-4471, Gaddis et al., (2013) *J. Leukoc. Biol*. 93: 21-31; Gaddis et al., (2009) *Mol. Immunol*. 46: 2493-2504; Gaddis et al., (2011) *J. Immunol*. 186: 5772-5783, Yang et al., (2002) *Infect. Immun*. 70: 3557-3565, Zhang et al., (2005) *Infect. Immun*. 73: 3990-3998, Zhang et al., (2004) *Infect. Immun*. 72: 637-644) were conducted since it has been shown that the induction of an immune response protective against alveolar bone loss in an experimental animal model following subcutaneous (s.c.) immunization with recombinant HagB (rHagB) (Katz et al., (1999) *Infect Immun*. 67: 4352-4359).

To determine the effectiveness of the new derivatives QS-17/18-based structurally defined adjuvants as a systemic adjuvant, as well as a mucosal adjuvant, rHagB was used as the antigen using previously described protocols (Zhang et al., (2003) *Vaccine*. 21(27-30): 4459-4471, Ashtekar et al., (2012) *PloS one*. 7 (11): e50460). In this series of experiments, mice were weighed, and serum, saliva and vaginal wash samples collected prior to immunization and at approximately 2-week intervals following the initial immunization. The levels of serum IgG and IgG subclass, salivary IgA and vaginal IgA and IgG antibody activity were determined using an enzyme-linked immunosorbent assay (ELISA), as previously described (Zhang et al., (2003) *Vaccine*. 21(27-30): 4459-4471, Ashtekar et al., (2012) *PloS one*. 7 (11): e50460). At the termination of the experiment (10 weeks after initial immunization), mice were weighed, samples collected, and following sacrifice, tissues will be collected from each animal for histological examination. Results on body weights and histology were used to assess toxicity.

The antibody activity results can be used to determine if differences exist in adjuvant activity (magnitude and nature of the responses) for the different QS-17/18 analogs.

Synthesis of 4x in a small scale provided 5.4 mg of the final product for preliminary immunological evaluation. For larger-scale synthesis of the oligosaccharide domain (Scheme 2), the monosaccharide building blocks were synthesized in 2-10 g amounts. The tetrasaccharide was obtained in more than 2 gram, and the common building block 17Bn was prepared in greater than 290 mg yields.

Figure 9:
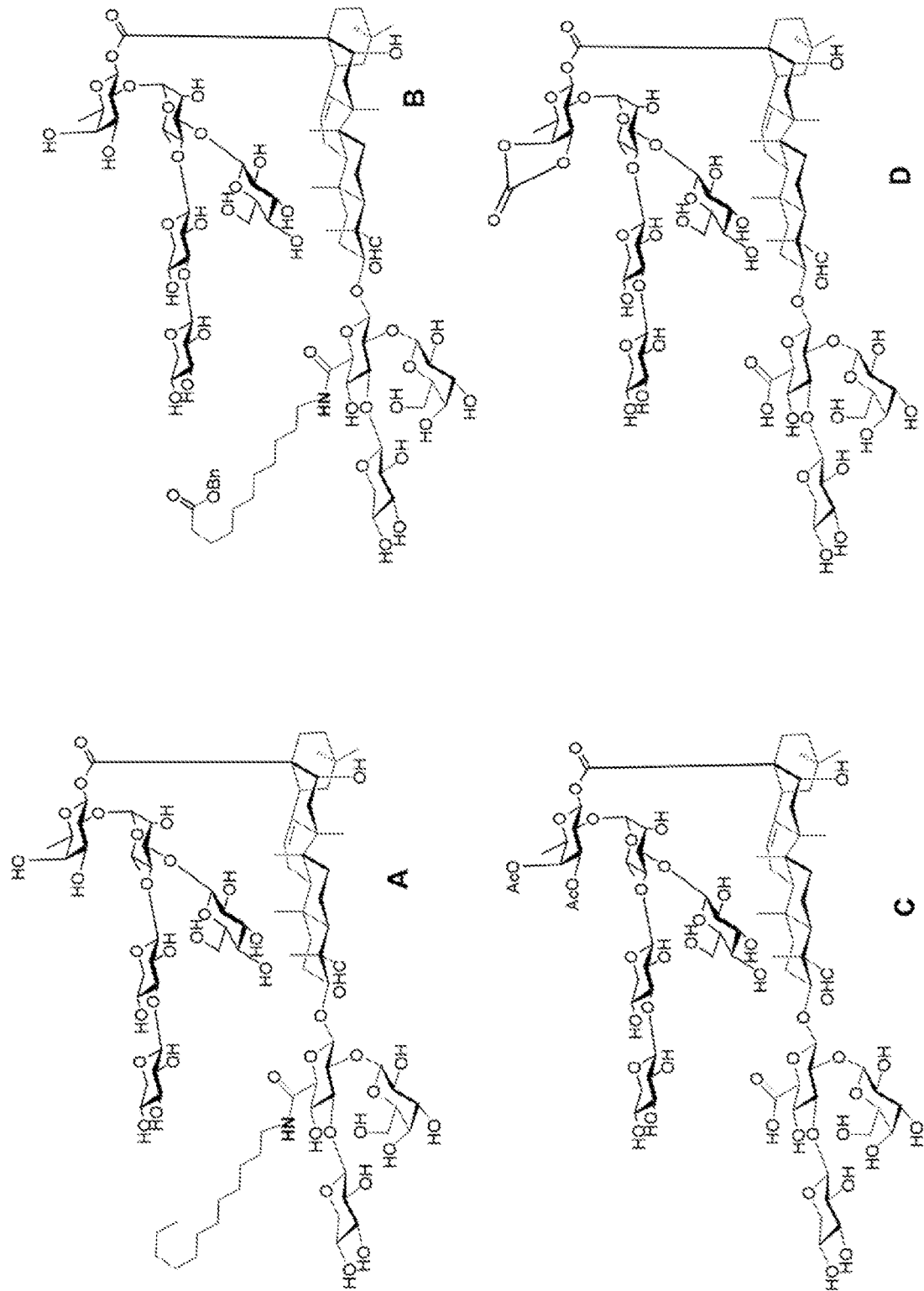
FIG. 9 illustrates the analogs A-D of the disclosure.

Also synthesized were the analogs A-D, as shown in FIG. 9 in a small scale for preliminary immunological screening. Immunological results of these four representative analogs can reveal the impact of a side chain on adjuvant activity and toxicity.

As mentioned above, compounds of the present disclosure and pharmaceutical compositions comprising these synthetic or modified saponins can be used in combination of one or more other therapeutic agents for treating viral infection and other diseases. For example, compounds of the present disclosure and pharmaceutical compositions provided herein can be employed in combination with other anti-viral agents to treat viral infection.

Accordingly, the present disclosure provides synthetic saponins that are modified to distinguish them from naturally occurring saponins. The modified saponins of the disclosure have improved adjunctivity compared to the unmodified parent saponins. Defined structures allow for comparisons of the modifying groups with respect to their adjunct activity and permit characterized vaccine formulations that have one or more defined saponins.

One aspect of the disclosure, therefore, encompasses embodiments of a modified saponin having the formula:

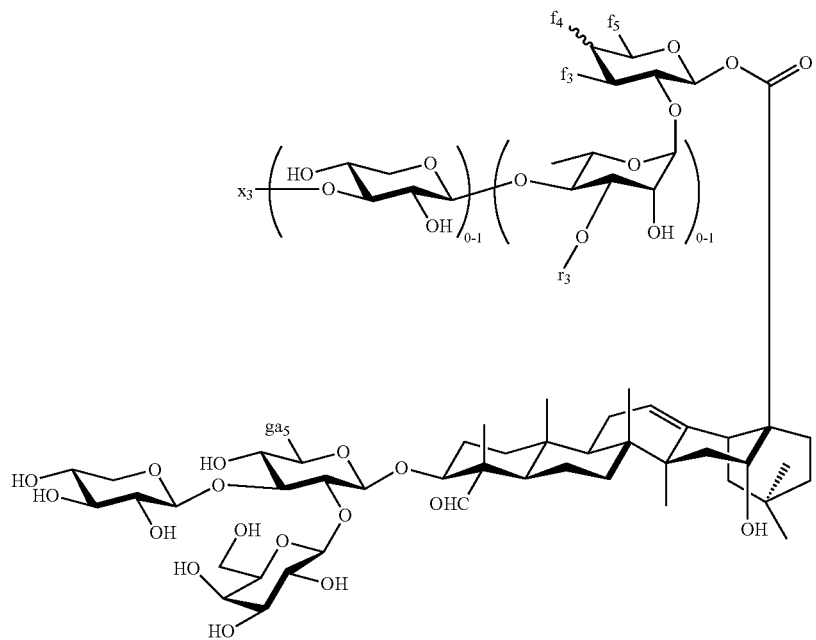

wherein: q1 can be H or OH; f3 and f4 can be each independently OH, acetyl, or a cyclic ketal ring or cyclic carbonate ester formed by the C3 and C4 of the fucosyl unit, f3, and f4; f5 can be a methyl group, a carboxyl group, $R_4$—$NR_5$—$C(O)$—, or an alkoxy group having the structure $R_4$—O—, wherein $R_4$ and $R_5$ can be each independently a linear chain having the structure $R_6(CH_2)_{0-20}$—, and wherein $R_6$ can be H, OH, COOH, COOMe, COOEt, COOiPr, COOtBu, or COOBn; r3 can be H, a monosaccharide, a disaccharide, or a trisaccharide; x3 can be H, a monosaccharide, or a disaccharide; and ga5 can be a carboxyl group, $R_4$—$NR_5$—$C(O)$—, or an alkoxy group having the structure $R_4$—O—, wherein $R_4$ and $R_5$ are each independently a linear chain having the structure $R_6(CH_2)_{0-20}$—, and wherein $R_6$ is H, OH, COOH, COOMe, COOEt, COOiPr, COOtBu, COOBn, a saccharide unit, a monophosphoryl lipid A (MPL), or a dipalmitoyl-S-glyceryl cysteine (PamCys) unit.

In some embodiments of this aspect of the disclosure the modified saponin can have the formula I:

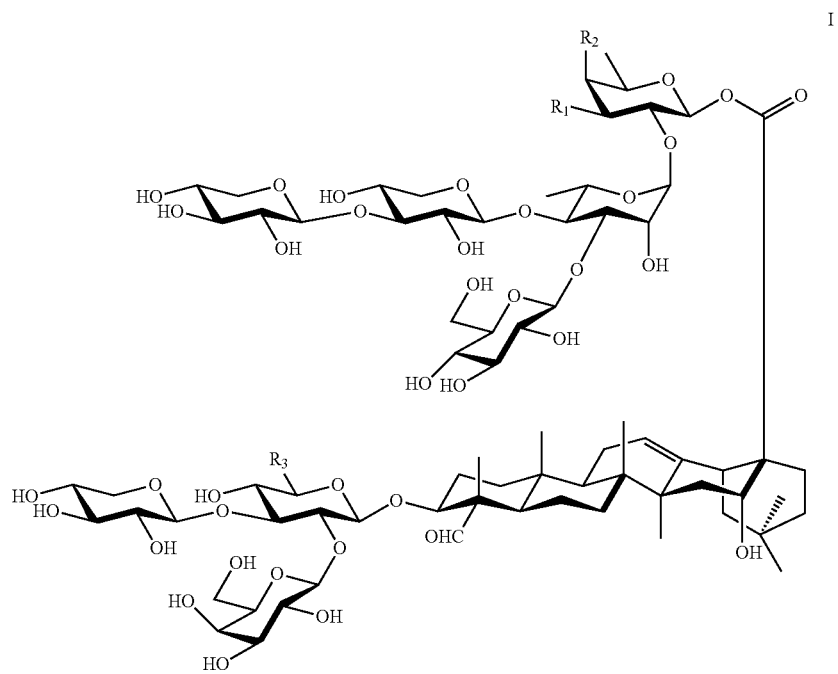

wherein: $R_1$ and $R_2$ can be each independently OH, acetyl, or a cyclic ketal ring or cyclic carbonate ester formed by the C3 and C4 of the fucosyl unit, $R_1$, and $R_2$; $R_3$ can be a carboxyl group, $R_4$—$NR_5$—C(O)—, or an alkoxy group having the structure $R_4$—O—, wherein $R_4$ and $R_5$ can be each independently a linear chain can have the structure $R_6(CH_2)_{0-20}$—, and wherein $R_6$ can be H, OH, COOH, COOMe, COOEt, COOiPr, COOtBu, COOBn, a saccharide unit, a monophosphoryl lipid A (MPL), or a dipalmitoyl-S-glyceryl cysteine (PamCys) unit.

In some embodiments of this aspect of the disclosure $R_1$ and $R_2$ can be each OH.

In some embodiments of this aspect of the disclosure $R_1$ and $R_2$ can be each acetyl.

In some embodiments of this aspect of the disclosure $R_1$ and $R_2$ form an acetonide group protecting the 3-OH and the 4-OH of the fucosyl unit.

In some embodiments of this aspect of the disclosure $R_1$ and $R_2$ form a carbonate ester group protecting the 3-OH and the 4-OH of the fucosyl unit.

In some embodiments of this aspect of the disclosure $R_3$ can be a carboxyl group.

In some embodiments of this aspect of the disclosure $R_3$ can be $R_4$—NH—CO—, wherein $R_4$ can be a long-chain fatty acid having the structure HOOC—$(CH_2)_{6-20}$—.

In some embodiments of this aspect of the disclosure $R_3$ can be $R_4$—NH—CO—, wherein $R_4$ can be a long-chain fatty acid having the structure HOOC—$(CH_2)_{11}$.

In some embodiments of this aspect of the disclosure $R_3$ can be an alkoxy group having the structure $H_3C$—$(CH_2)_{6-20}$—O—.

In some embodiments of this aspect of the disclosure $R_3$ can be $R_4$—NH—CO—, wherein $R_4$ can be a long-chain alcohol having the structure HO—$(CH_2)_{6-20}$—.

In some embodiments of this aspect of the disclosure $R_3$ can be $R_4$—NH—CO—, wherein $R_4$ can be a long-chain terminated with a functional group selected from an ester group, an ether group, an amino group, a cyano group, a carbonyl group, an azido group, and an aromatic group.

In some embodiments of this aspect of the disclosure $R_3$ can be $R_4$—NH—CO—, wherein $R_4$ can be a saccharide unit selected from the group consisting of a monosaccharide, a disaccharide, and trisaccharide.

In some embodiments of this aspect of the disclosure $R_3$ can be $R_4$—NH—CO—, wherein $R_4$ can be a MPL unit.

In some embodiments of this aspect of the disclosure $R_3$ can be $R_4$—NH—CO—, wherein $R_4$ can be a Pam2Cys unit or Pam3Cys unit.

In some embodiments of this aspect of the disclosure the modified saponin can be a semisynthetic analog selected from the group consisting of A-D, and can have any of the formulas:

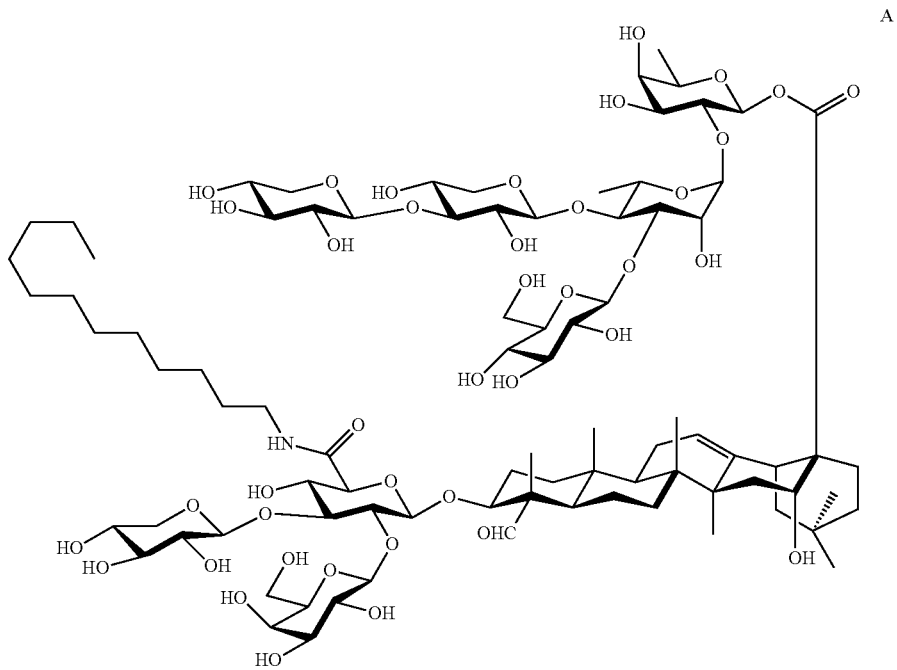

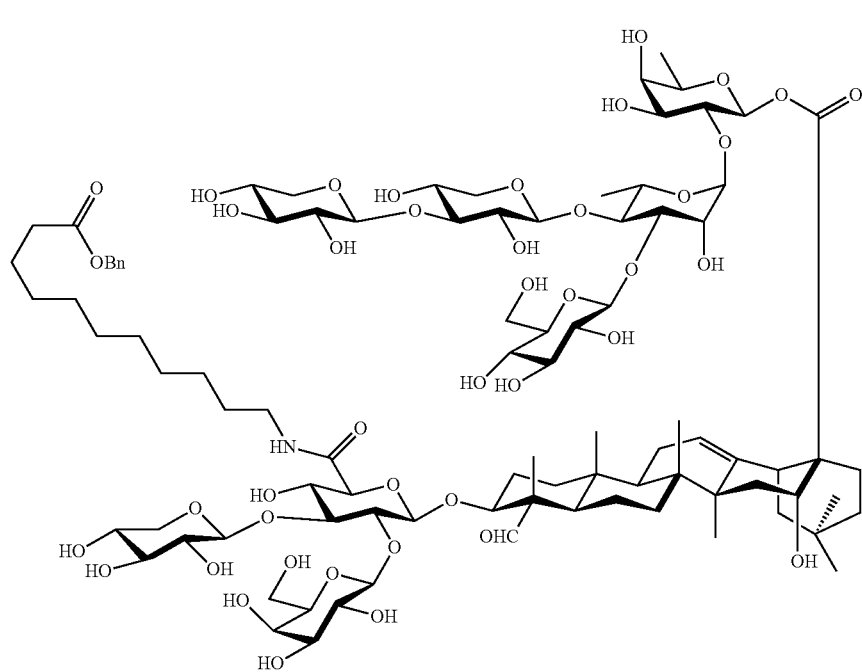
B
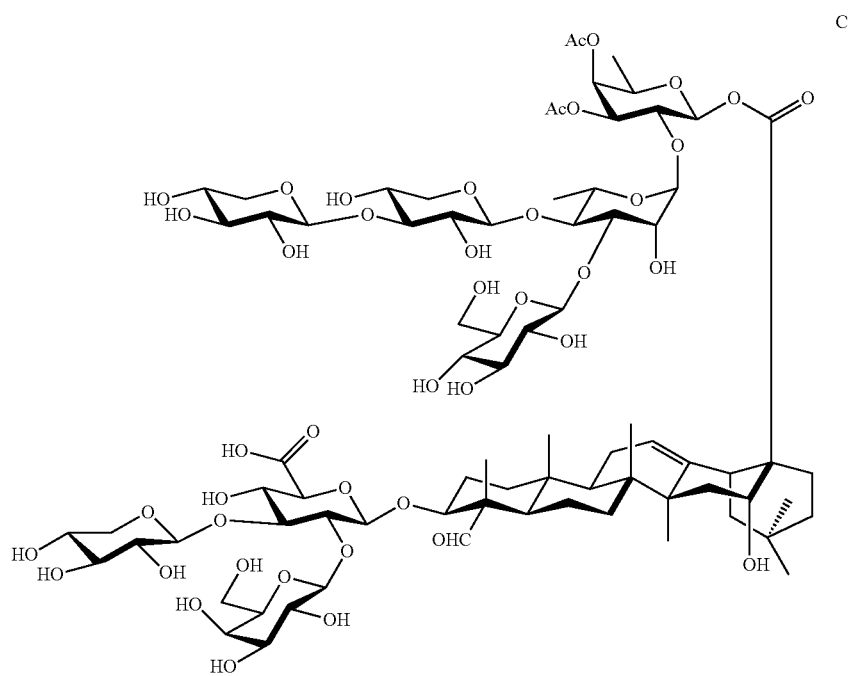
C

D

In some embodiments of this aspen of the disclosure the modified saponin can be an immunomodulatory increasing the antigenicity of an immunogen when co-administered therewith to an animal or human.

Another aspect of the disclosure encompasses embodiments of a pharmaceutical composition comprising a modified saponin having the formula I:

wherein: $R_1$ and $R_2$ can be each independently OH, acetyl, or a cyclic ketal ring or cyclic carbonate ester formed by the C3 and C4 of the fucosyl unit, $R_1$, and $R_2$; $R_3$ can be a carboxyl group, $R_4$—$NR_5$—C(O)—, or an alkoxy group having the structure $R_4$—O—, wherein $R_4$ and $R_5$ can be each independently a linear chain having the structure $R_6(CH_2)_{0\text{-}20}$—, and wherein $R_6$ can be H, OH, COOH,

I

COOMe, COOEt, COOiPr, COOtBu, COOBn, a saccharide unit, a monophosphoryl lipid A (MPL), or a dipalmitoyl-S-glyceryl cysteine (PamCys) unit.

In some embodiments of this aspect of the disclosure $R_1$ and $R_2$ can be each OH.

In some embodiments of this aspect of the disclosure $R_1$ and $R_2$ can be each acetyl.

In some embodiments of this aspect of the disclosure $R_3$ can be an acyl group.

In some embodiments of this aspect of the disclosure $R_3$ can be $R_4$—NH—CO—, wherein $R_4$ can be a long-chain fatty acid having the structure HOOC—$(CH_2)_{6-20}$—.

In some embodiments of this aspect of the disclosure $R_3$ can be $R_4$—NH—CO—, wherein $R_4$ can be a long-chain fatty acid having the structure HOOC—$(CH_2)_{11}$.

In some embodiments of this aspect of the disclosure $R_3$ can be an alkoxy group having the structure $H_3C$—$(CH_2)_{6-20}$—CO—.

In some embodiments of this aspect of the disclosure the pharmaceutical composition can comprise a saponin analog selected from the group consisting of A-D, and can have any of the formulas:

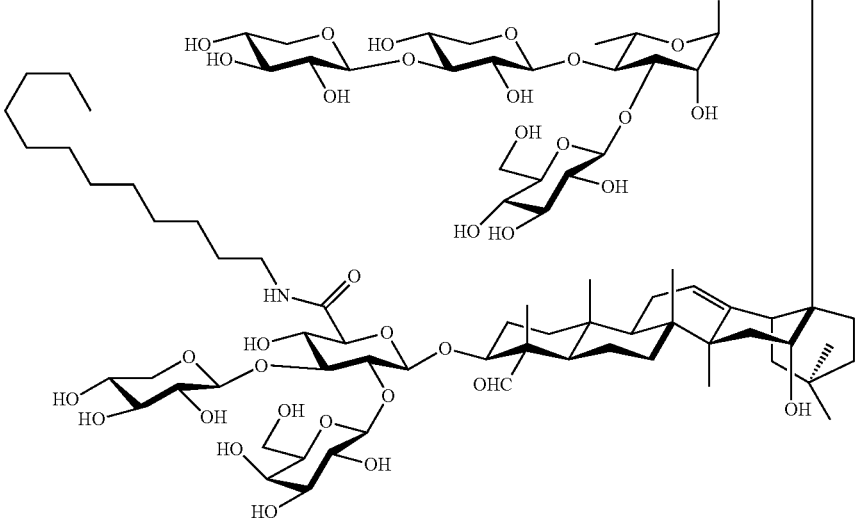

A

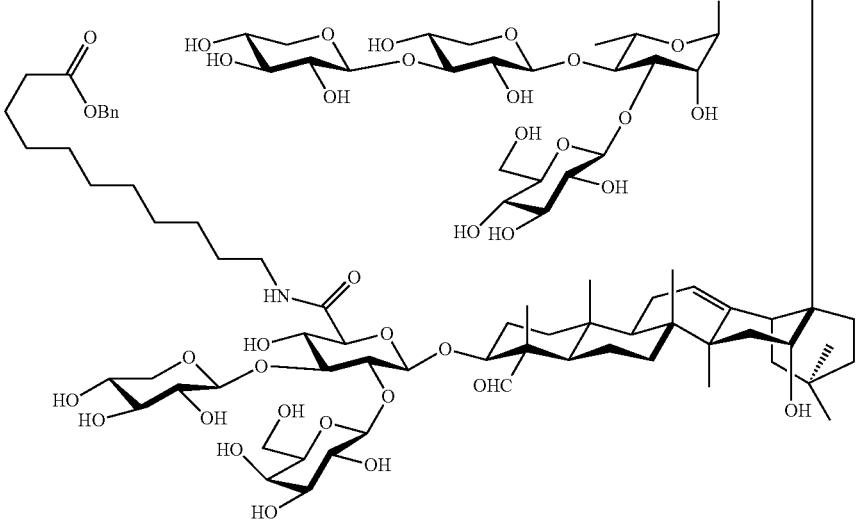

B

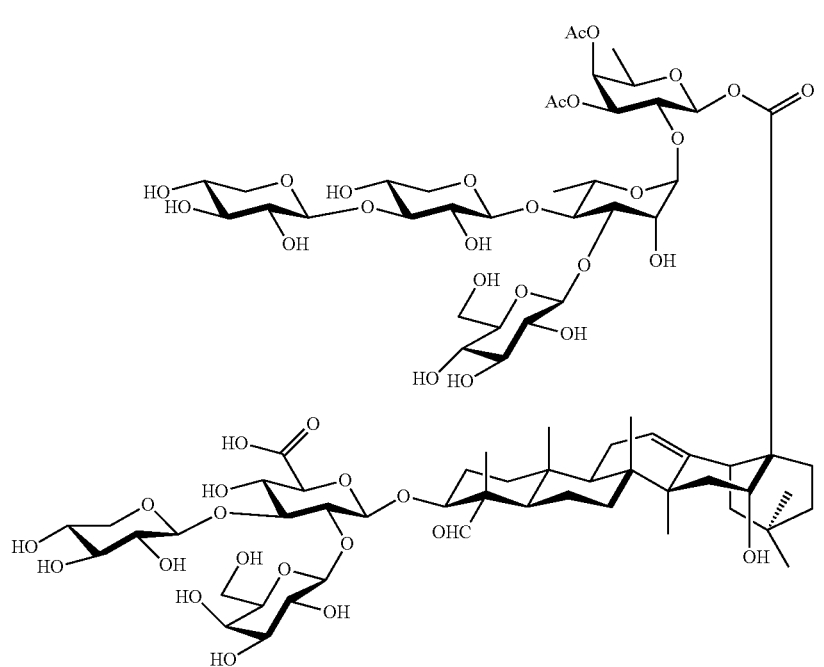

C

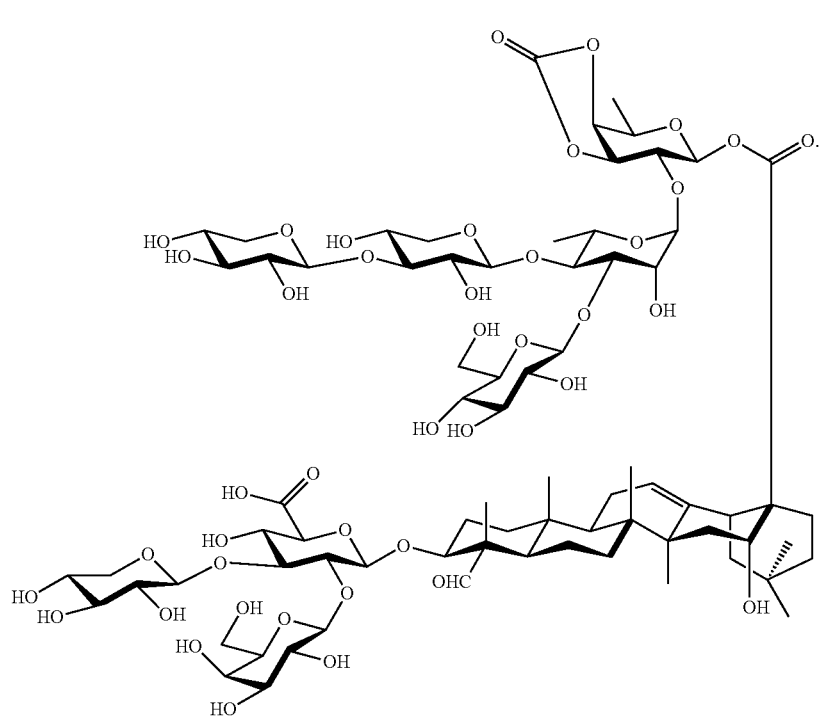

D

In some embodiments of this aspect of the disclosure the pharmaceutical composition can further comprise at least one immunogen and a pharmaceutically acceptable carrier.

In some embodiments of this aspect of the disclosure the pharmaceutical composition can be formulated for administering to an animal or human subject.

Yet another aspect of the disclosure encompasses embodiments of a method of increasing the immunogenicity of an immunogen when administered to an animal or human subject comprising the steps of co-administering to the subject a vaccine comprising at least one modified saponin adjunct of the disclosure and an immunogenic moiety.

While embodiments of the present disclosure are described in connection with the Examples and the corresponding text and figures, there is no intent to limit the disclosure to the embodiments in these descriptions. On the contrary, the intent is to cover all alternatives, modifications, and equivalents included within the spirit and scope of embodiments of the present disclosure.

EXAMPLES

Example 1

Figure 5:
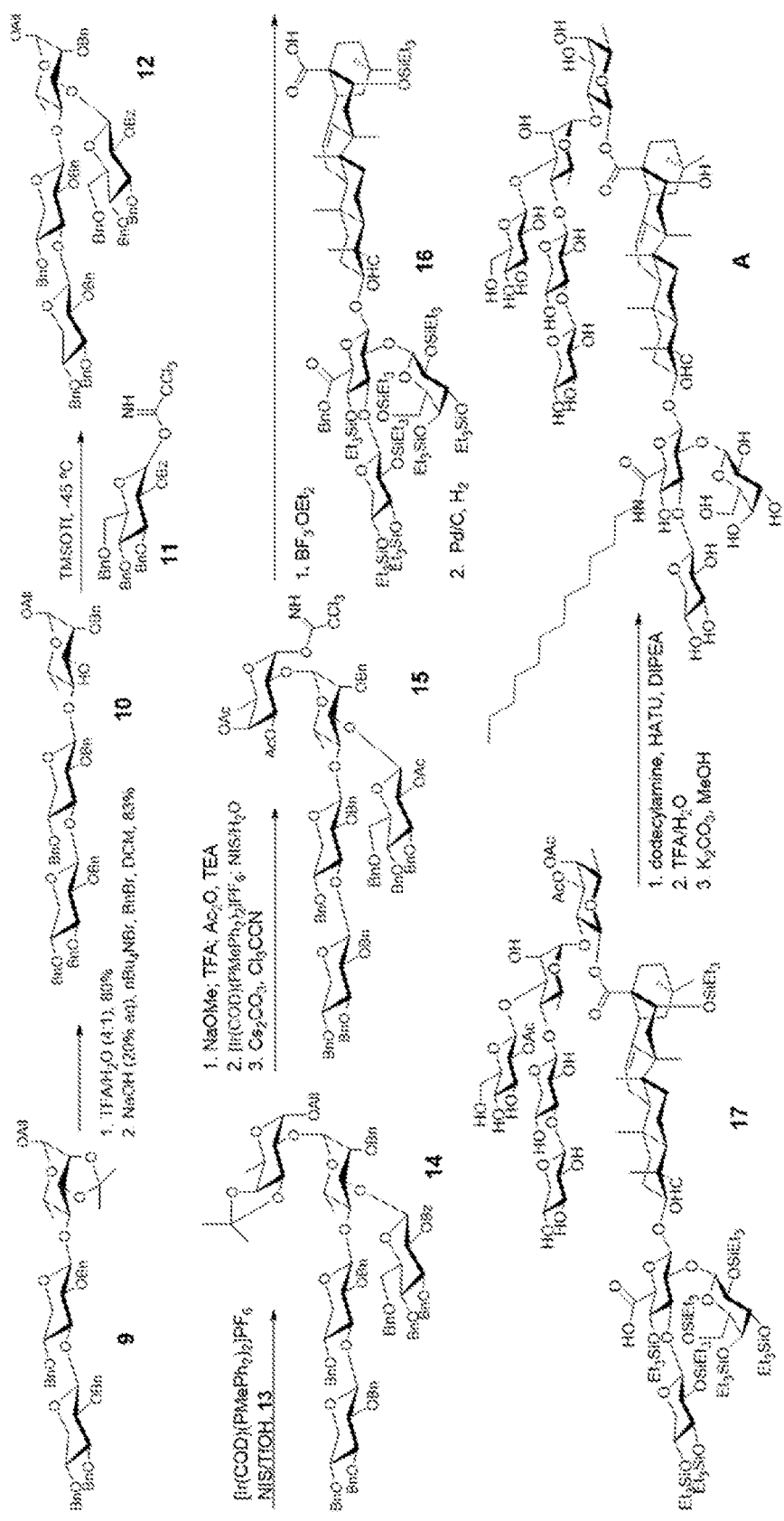
FIG. 5 illustrates Scheme 1 for the synthesis of saponin-based adjuvant A.

Synthesis: Synthesis of the adjuvants of the disclosure is exemplified by the synthesis of A (Scheme 1, FIG. 5) (Wang et al., (2019) *J. Med. Chem.* 62: 1669-1676). The synthetic scheme has been validated, for large-scale synthesis of 4. Synthesis of the trisaccharide 9 by using simple allyl building blocks is known (Wang et al., (2007) *J. Org. Chem.* 72: 5870-5873). Thus, removal of the acetonide prtecting group on the rhamnosyl unit followed by regioselective benzylation under phase-transfer reaction conditions (Deng et al., (2008) *J. Am. Chem. Soc.* 130: 5860-5861) led to the trisaccharide acceptor 10 in 66% yield over two steps. Compound 10 is coupled with the known donor 11 by adopting the conditions from the synthesis of QS-7 (Deng et al., (2008) *J. Am. Chem. Soc.* 130: 5860-5861) to make the branched tetrasaccharide 12. With the donor 12 and the allyl fucoside acceptor 13 (i.e., allyl 3,4-O-isopropylidene-α-D-fucopyranoside), the two-stage activation glycosylation protocol produces the pentasaccharide 14. The pentasaccharide 14 can undergo necessary protecting group replacement and anomeric group manipulation to provide the trichloroacetimidate donor 15 for optimal coupling in the next step with the acceptor 16 (Wang et al., (2013) *J. Org. Chem.* 78: 11525-11534). Glycosylation of the imidate donor 15 with the quillaic acid-trisaccharide conjugate 16 followed by de-benzylation under hydrogenolysis conditions provides the intermediate 17 (Wang et al., (2013) *J. Org. Chem.* 78: 11525-11534). The compound 17 couples with dodecylamine and subsequent global deprotection can generate the desired adjuvant 4x, i.e., A. The conjugate 16 was prepared in three steps from commercially available saponin extracts by using a published procedure (Deng et al., (2008) *Angew Chem. Int. Ed.* 47(34) 6395-6398; Higuchi et al., (1987) *Phytochem.* 26: 229-235, incorporated herein by reference in their entireties).

Example 2

Figure 6:
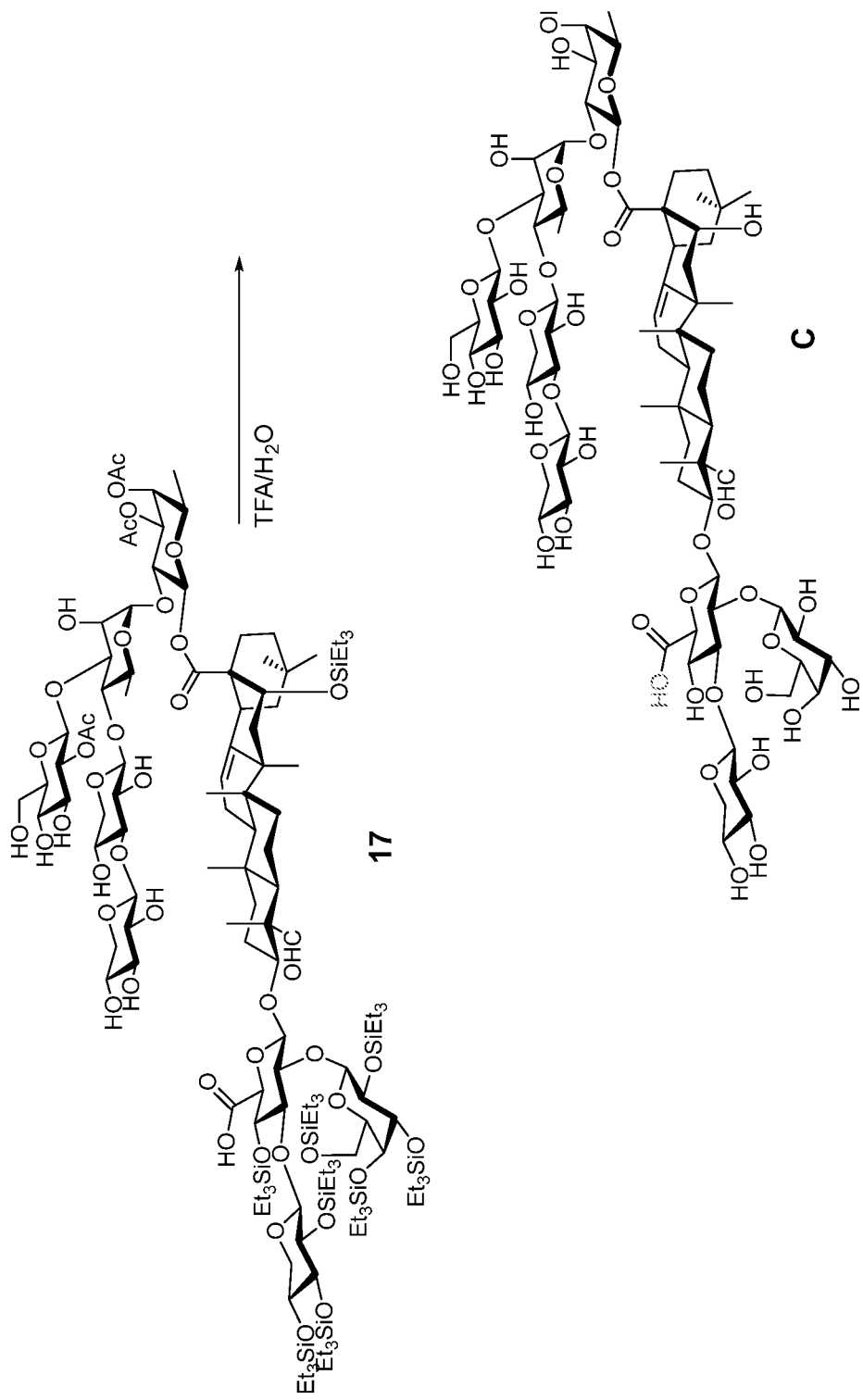
FIG. 6 illustrates Scheme 2 for the synthesis of saponin-based adjuvant C.
Figure 7A:
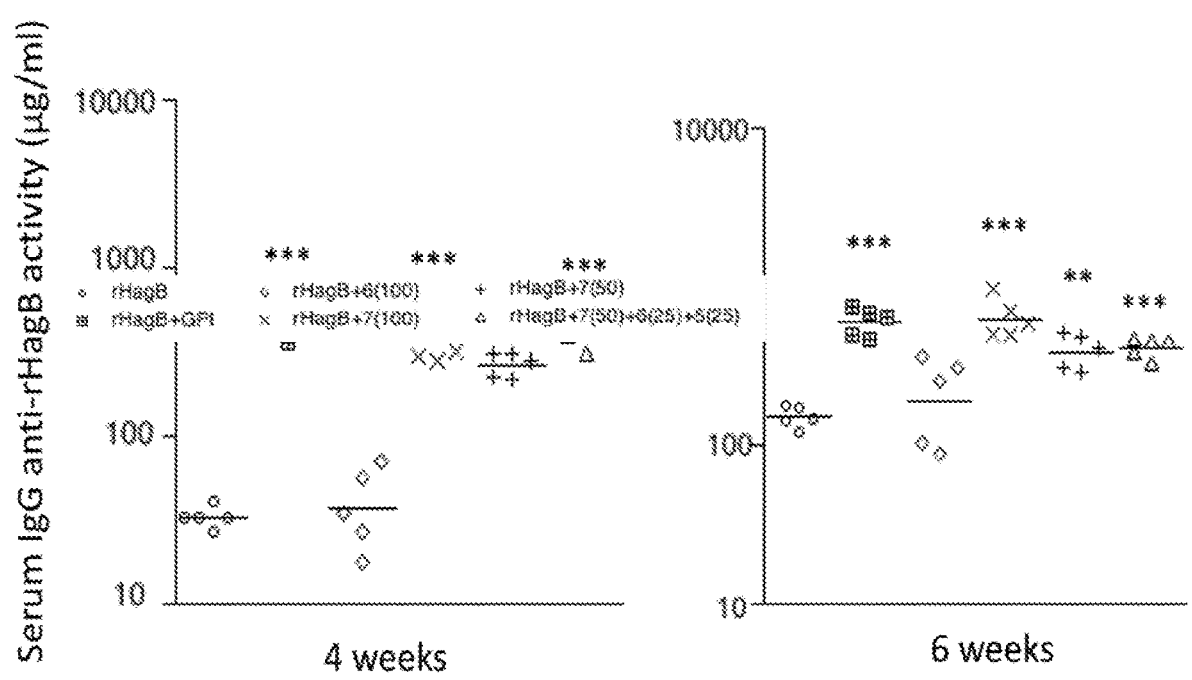
FIG. 7A illustrates is a pair of graphs illustrating a serum IgG anti-rHagB response in mice immunized by the subcutaneous route with rHagB alone, with GPI-0100, the saponin QS-21 analog 6, or QS-17/18 analog A (7). Serum IgG anti-rHagB activity at weeks 4 and 6. Data are expressed as the geometric values. Horizontal bars indicate mean concentrations. Statistical significance compared to no-adjuvant control, $P<0.01$, *$P<0.001$.
Figure 7B:
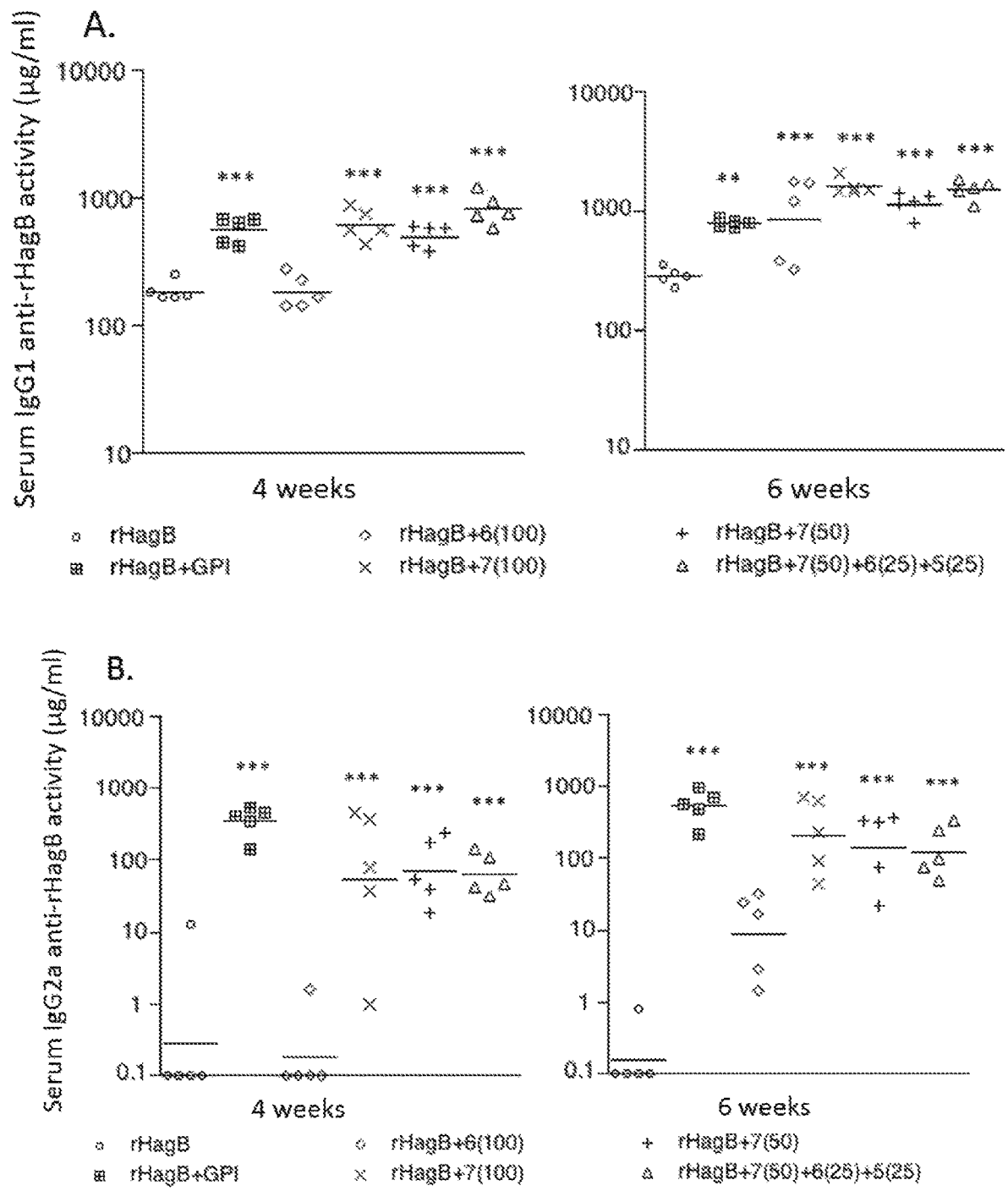
FIG. 7B illustrates serum IgG anti-rHagB responses in mice immunized by the subcutaneous route with rHagB alone, with GPI-0100, the saponin QS-21 analog 6, or QS-17/18 analog A (7). Serum IgG1 (top) and IgG2a (bottom) anti-rHagB activity at weeks 4 and 6. Data are expressed as the geometric values. Horizontal bars indicate mean concentrations. Statistical significance compared to no-adjuvant control, $P<0.01$, *$P<0.001$.
Figure 8A:
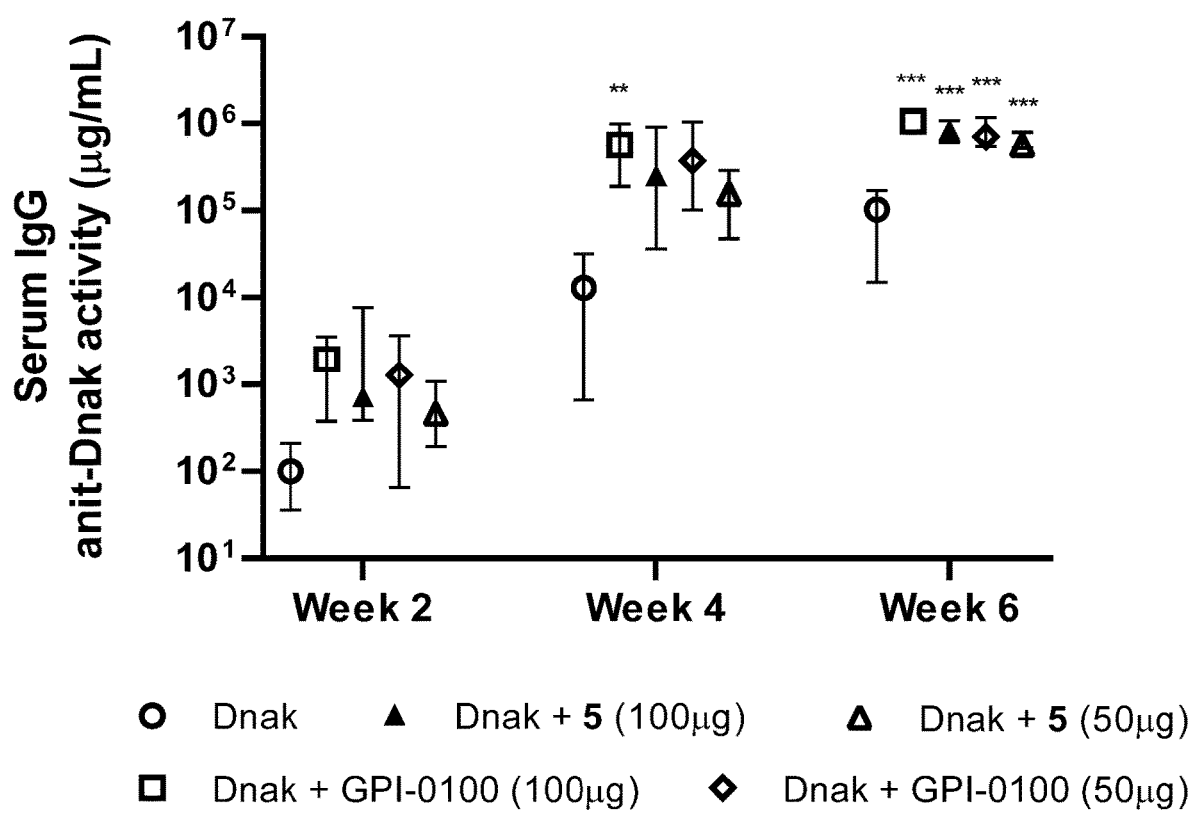
FIG. 8A illustrates a graph illustrating a serum IgG anti-Dnak response in mice immunized by the subcutaneous route with Dnak alone, with GPI-0100, or QS-17/18 analog C (5) at different doses. Serum IgG anti-Dnak activity at weeks 2, 4 and 6. Data are expressed as mean with range. Statistical significance compared to no-adjuvant control, *$P<0.05$, $P<0.01$, *$P<0.001$.
Figure 8B:
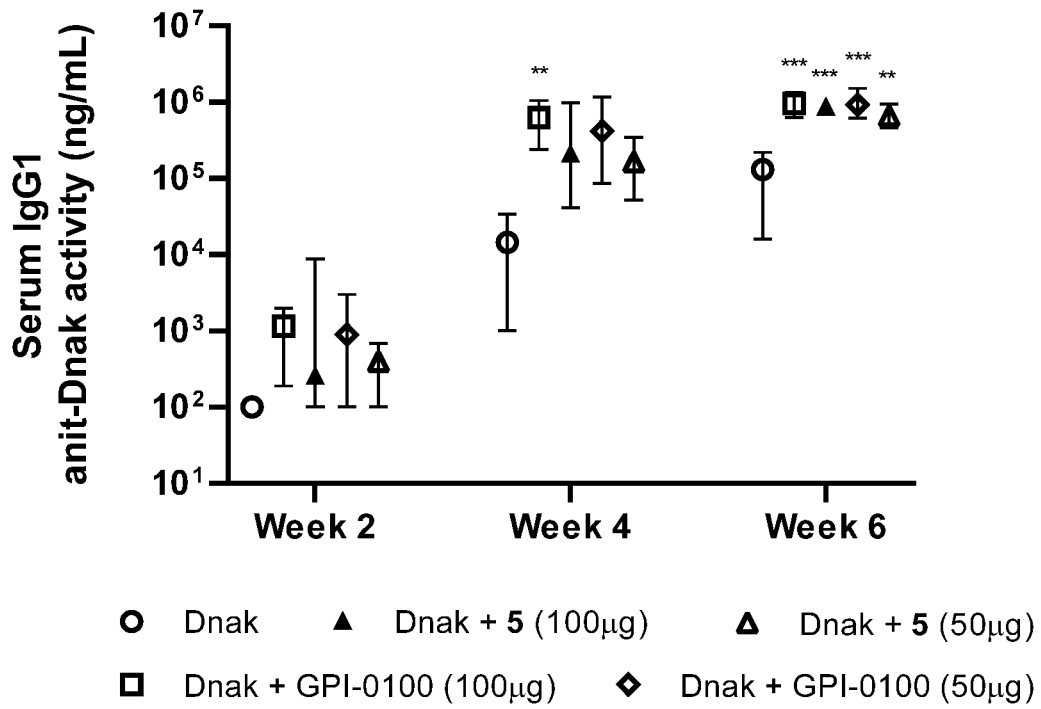
FIG. 8B illustrates serum IgG anti-Dnak responses in mice immunized by the subcutaneous route with Dnak alone, with GPI-0100, or QS-17/18 analog C (5) at different doses. Serum IgG1 (top) and IgG2a (bottom) anti-Dnak activities at weeks 2, 4, and 6. Data are expressed as mean with range. Statistical significance compared to no-adjuvant control, *$P<0.05$, $P<0.01$,*$P<0.001$.
Figure 8B:
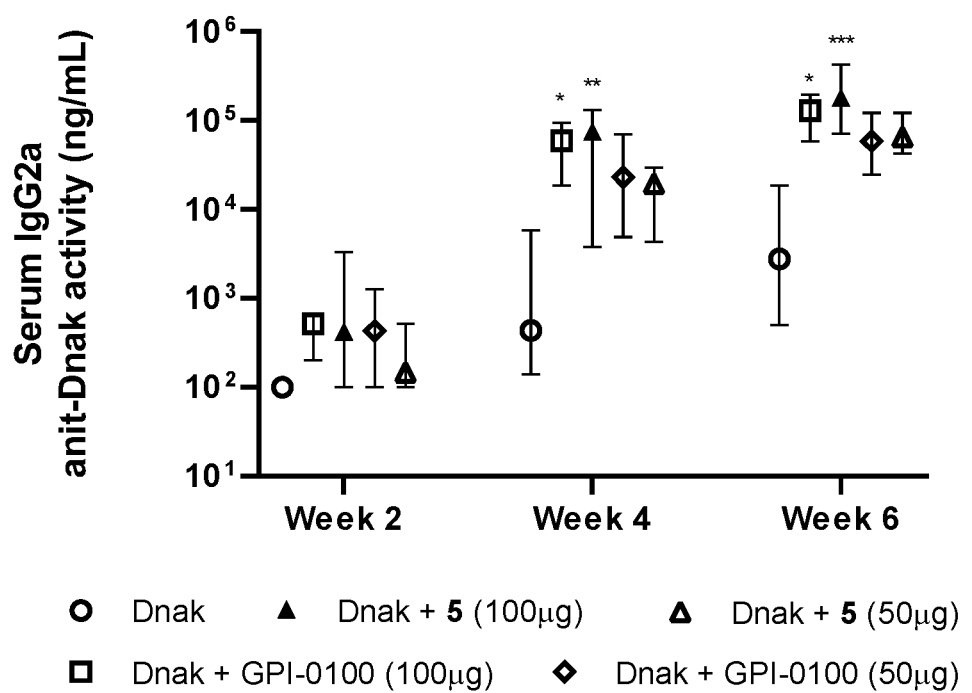

Synthesis: Synthesis of the adjuvants of the disclosure is exemplified by the synthesis of C (Scheme 2, FIG. 6). Intermediate 17 has been synthesized (Wang et al., (2019) *J. Med. Chem.* 62: 1669-1676). Compound 17 was cooled to 0° C. and treated with TFA/water (1:1, v/v) precooled to 0° C. The reaction solution was stirred at 0° C. for 40 min, and then concentrated to dryness at 0° C. The crude product was then purified with RP-HPLC by using a semi-prep 250×10 mm 5 micron C18 column and $H_2O$/MeCN gradients (90%-10% $H_2O$ over 30 minutes with 3 mL/min flow rate). The desired product had a retention time of 26 min and the fraction was concentrated on a rotary evaporator at room temperature to remove MeCN, and the remaining water was then removed on a lyophilizer to provide final product C as a white solid.

Example 3

Immunological evaluation (exemplified with immunological evaluation of compound A with rHagB antigen): BALB/c mice used in this study were purchased from Frederick Cancer Research (Fredrick, MD). To assess the adjuvant activity of the QS saponin-based immune adjuvants, groups of female mice (8-10 weeks of age; 5 mice per group) were immunized by the subcutaneous (s.c.) route with rHagB (20 µg) along, GPI-0100 (100 µg), synthetic adjuvants (100 µg or 50 µg), or with a mixture of synthetic adjuvants on days 0, 14 and 28.

Mice were weighed and blood samples were collected prior to and at various time points following the initial immunization. Blood samples were collected from the retro-orbital plexus by using heparinized capillary pipettes. The serum was obtained after centrifugation and stored at −20° C. until assayed. The levels of specific serum IgG and IgG subclasses against rHagB in each group were determined by an enzyme-linked immunosorbent assay (ELISA). Maxisorpmicrotiter plates (NUNC International, Roskilde, Denmark) were coated with rHagB (1 µg/ml) or with optimal amounts of goat anti-mouse IgG, IgG1 or IgG2a (Southern Biotechnology Associates, Inc., Birmingham, AL) in borate buffer saline (BBS; 100 mM NaCl, 50 mM boric acid, 1.2 mM Na2B4O7, pH 8.2) at 4° C. overnight. Plates were blocked with 1% bovine serum albumin (BSA) and 0.02% sodium azide in BBS for 2 h at room temperature. Serial two-fold dilutions of serum samples and were added in duplicate to the plates. To generate standard curves, serial dilutions of a mouse immunoglobulin reference serum (MP Biomedicals, Solon, OH) were added to two rows of wells in each plate that had been coated with the appropriate anti-mouse IgG or IgG subclass reagent.

After incubation overnight at 4° C. and washing of the plates, horseradish peroxidase-conjugated goat anti-mouse IgG or IgG subclass antibody (Southern Biotechnology Associates, Inc.) was added to appropriate wells. After 4 h of incubation at room temperature, plates were washed and developed by o-phenylenediamine substrate with hydrogen peroxide. Color development was recorded at 490 nm. The concentrations of antibodies were determined by interpolation on standard curves generated by using the mouse immunoglobulin reference serum and constructed by a computer program based on four-parameter logistic algorithms (Softmax/Molecular Devices Corp., Menlo Park, CA).

Example 4

Figure 2:
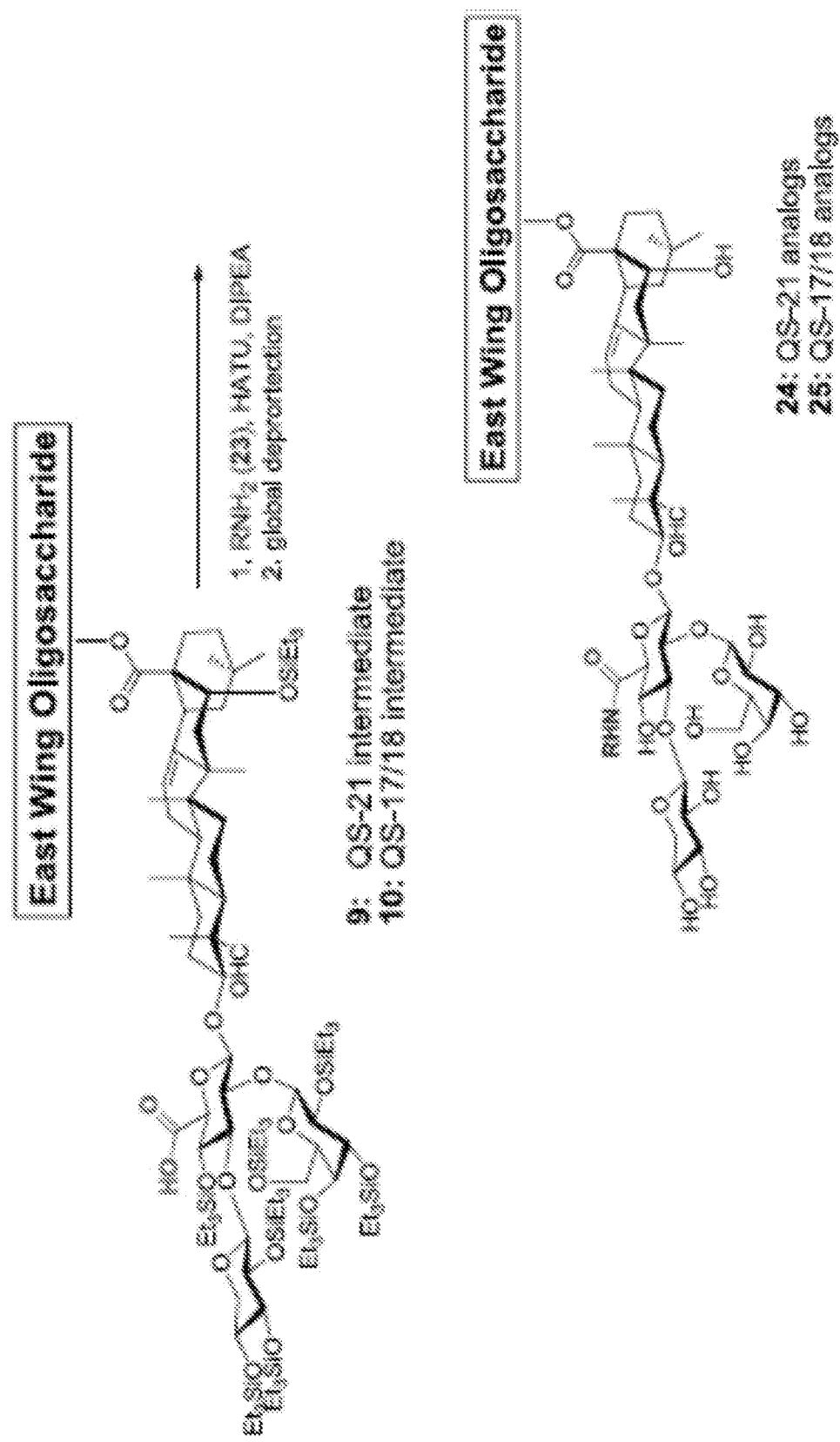
FIG. 2 illustrates a scheme for the incorporation of side-chains in West Wing derivatization of saponins.

Choice of side chain: With 9 and 10, the side chain 23 can be incorporated with a standard amide formation procedure to produce the QS-21 series of analogs 24 and the QS-17/18 series of analogs 25 (Scheme 3, FIG. 2). Preliminary studies revealed that the structure of the incorporated side chain has a significant impact on adjuvant activity in terms of magnitude and nature of the stimulated immune responses.

Therefore, analogs with different side chains (FIG. 4) could be synthesized (through divergent synthesis from the key intermediate 9 or 10) and evaluated.

(a) Simple side chains 23a, 23b, and 23c: Since the QS-21 analogs 6x and 7x showed promising adjuvanticity, the same side chains (i.e., 23a and 23b, FIG. 4) were examined in the corresponding QS-17/18 analogs (i.e., 25a and 25b). The new side chain 25c is similar to 23a except a terminal aldehyde moiety is in place of the terminal carboxyl group. Earlier SAR studies showed that the carbonyl group on the quillaic acid core of the natural QS-21 is crucial for the adjuvant activity of QS-21 (Liu et al., (2011) *Vaccine.* 29: 2037-2043). It was suggested that the carbonyl group could form an imine with an amino group on T cell surface receptor. This Schiff-base formation probably provides a co-stimulatory signal and leads to T-cell activation and Th1 immunity (Liu et al., (2011) *Vaccine.* 29: 2037-2043; Deng et al., (2008) *J. Am. Chem. Soc.* 130: 5860-5861). Incorporation of an additional aldehyde moiety would likely will enhance the Schiff-base-induced interaction between the adjuvant molecule and T cell surface receptor and enhance Th1 immunity. The west wing analogs of both QS-21 and QS-17/18 with the side chain 23c (i.e., 24c and 25c) can be synthesized by using the method depicted in Scheme 3.

(b) MPL side chain 23d for QS-MPL combination adjuvant: The terminal group can also be derived from an established adjuvant moiety. Although the molecular mechanism of QS-21 and its variants' adjuvanticity is unclear, it is known that it acts synergistically in animal models with other adjuvants such as monophosphoryl lipid A (MPL, a TLR4 agonist) (Ashtekar et al., (2012) *PloS one.* 7: e50460). MPL is known for $TLR_4$ activation, enhancing Th1 type cellular and humoral immune responses significantly. It typically boosts serum Ab titers by 10-20 fold when compared to vaccine alone. Human vaccine trials indicate that MPL has a safety profile similar to that of alum (Wang et al., (2016) *J. Org. Chem.* 81: 9560-9566). Accordingly, the MPL side chain 23d can be incorporated into the saponin intermediate 9 and 10 to produce the corresponding QS-MPL single-molecule combination adjuvants. Synthesis of 24d and 25d is as in Scheme 3, given that the QS intermediates 9 and 10 are available and synthesis of the side chain 23d is also known.

(c) Pam2Cys side chain 23e for QS-Pam2Cys combination adjuvant: Pam2Cys and Pam3Cys, synthetic analogs of bacterial lipopeptides, are two TLR2 agonists and used as vaccine adjuvants in preclinical studies. These lipid adjuvants enhance both humoral and cell mediated responses but they are less effective in boosting CTL responses. They have been shown to be effective for epitope-based vaccines and do not exhibit the harmful side effects that are commonly associated with many other adjuvant formulations. Chemical incorporation of Pam3Cys into a fully synthetic carbohydrate-based anticancer vaccine has shown results, which demonstrated that chemically connecting the TLR2 agonist is feasible to enhance immune response. Synthesis of the properly protected Pam2Cys moiety is a known in the literature.

Example 5

Figure 10:
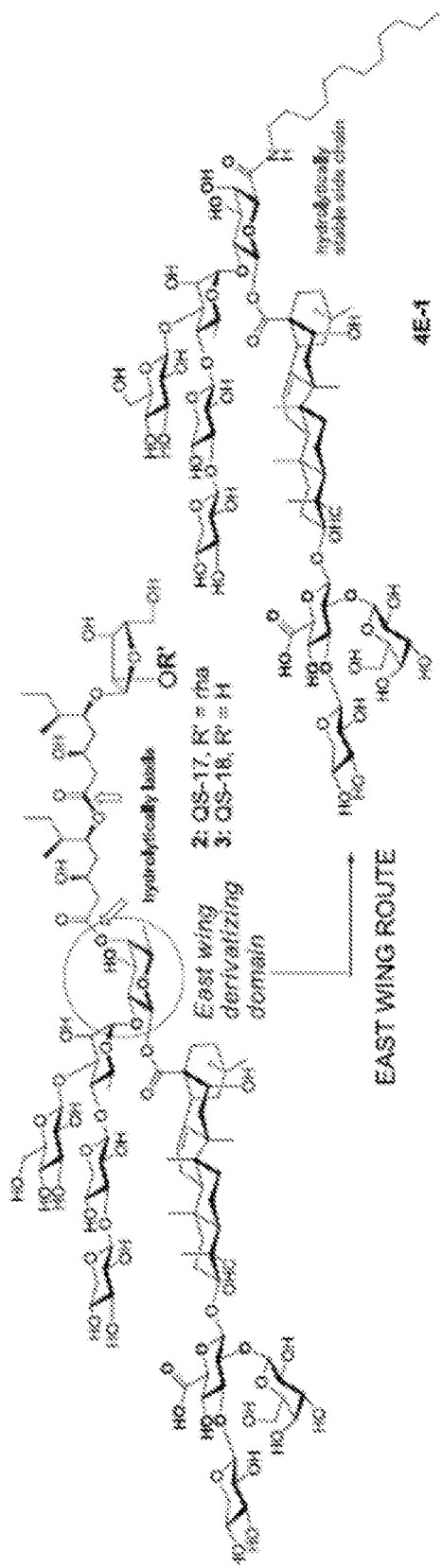
FIG. 10 illustrates a scheme for the synthesis of the East Wing analog 4E-1.
Figure 11:
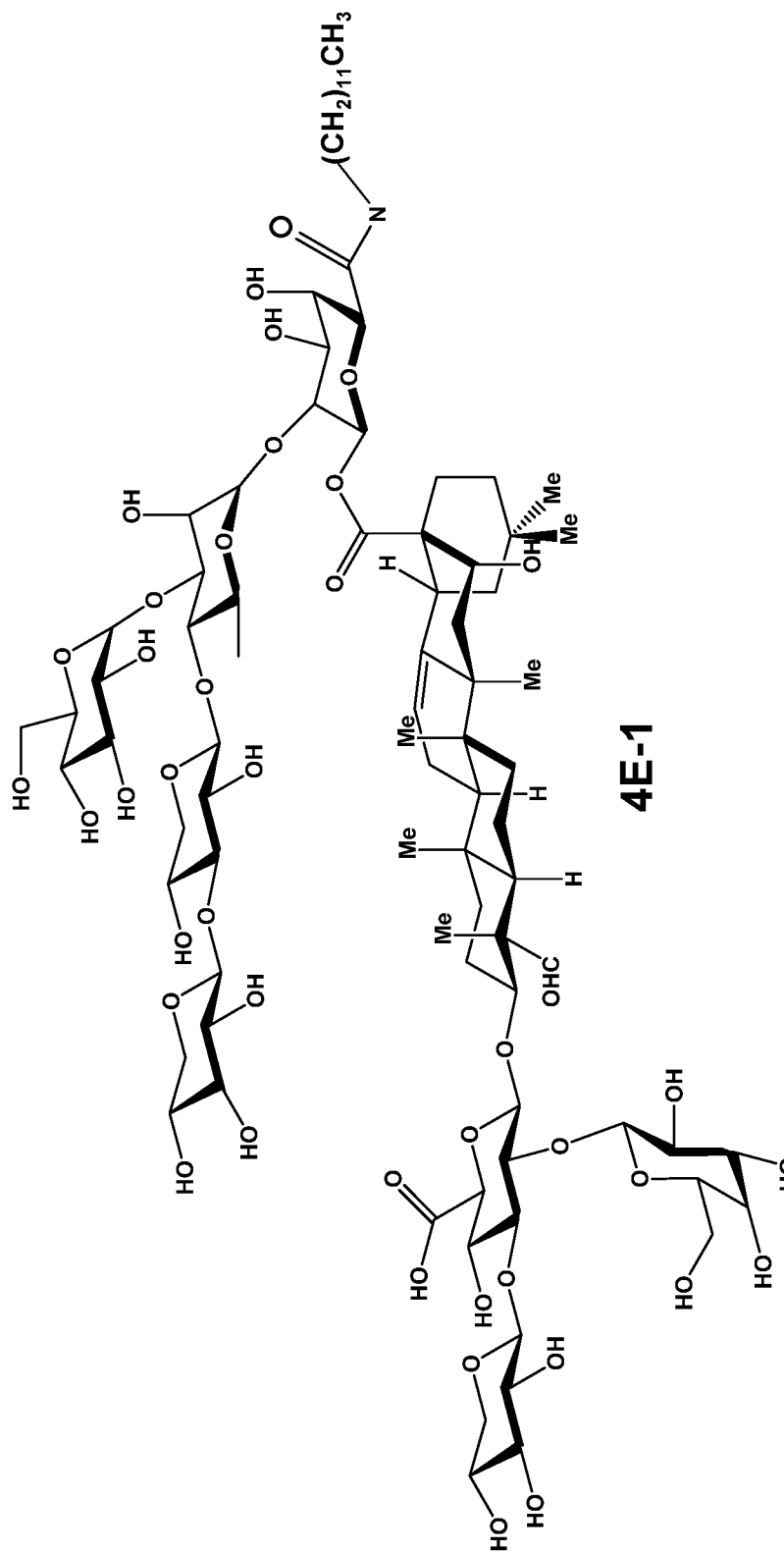
FIG. 11 illustrates analog 4E-1.

Synthesis and evaluation of QS saponin-based adjuvants with a galacturonic acid unit in place of the east wing native fucose unit for easy side chain attachment: In parallel to pursuit of new QS saponin analogs along the direction of modifying the west wing glucuronic acid moiety it is possible to synthesize and evaluate another series of analogs as exemplified by the QS-17/18 analog 4E, as shown in Scheme 5, FIGS. 10 and 11-12). This second series of analogs resembles the natural products closely with a side chain incorporated to the reducing end of the east wing oligosaccharide domain. Due to their structural resemblance to the natural products, these analogs can have an activity profile similar to that of their natural counterparts. Analogs different fri the natural products can be synthesized by replacing the fucose unit in the east wing oligosaccharide domain of QS-21 with a synthesized 4-amino sugar (Chea et al., (2012) *J. Am. Chem. Soc.* 134: 13448-13457, Fernández-Tejada et al., (2014) *Nat. Chem.* 6: 635-643) using commercially available D-galacturonic acid.

Wth the galacturonic acid as the joint unit, incorporation of a side chain at a late stage of synthesis is more flexible. This molecular design, along with the alidated efficient modular semi-synthetic strategy featuring the novel two-stage donor activation glycosylation approach, simplifies the synthesis of adjuvants with structural complexity similar to their natural counterparts. It is, therefore, an alternative way of rapid access to various engineered QS saponin derivatives (including derivatives of QS-21 and underexplored QS-17/18) for SAR exploration and for systematic and rational optimization of adjuvant properties.

It is known that the lipophilic acyl chain is important for QS saponins' adjuvant activity and toxicity. Loss of the side chain during storage results in a loss of the vaccine's capacity of stimulating a Th1 immune response and producing antigen-specific CTL, which are both required for anti-viral, anti-parasitic or anti-cancer vaccines. To improve the chemical stability, the hydrolytically labile ester linkage connecting the side chain to the main frame of the saponin was replaced by a chemically more stable amide linkage.

Figure 12:
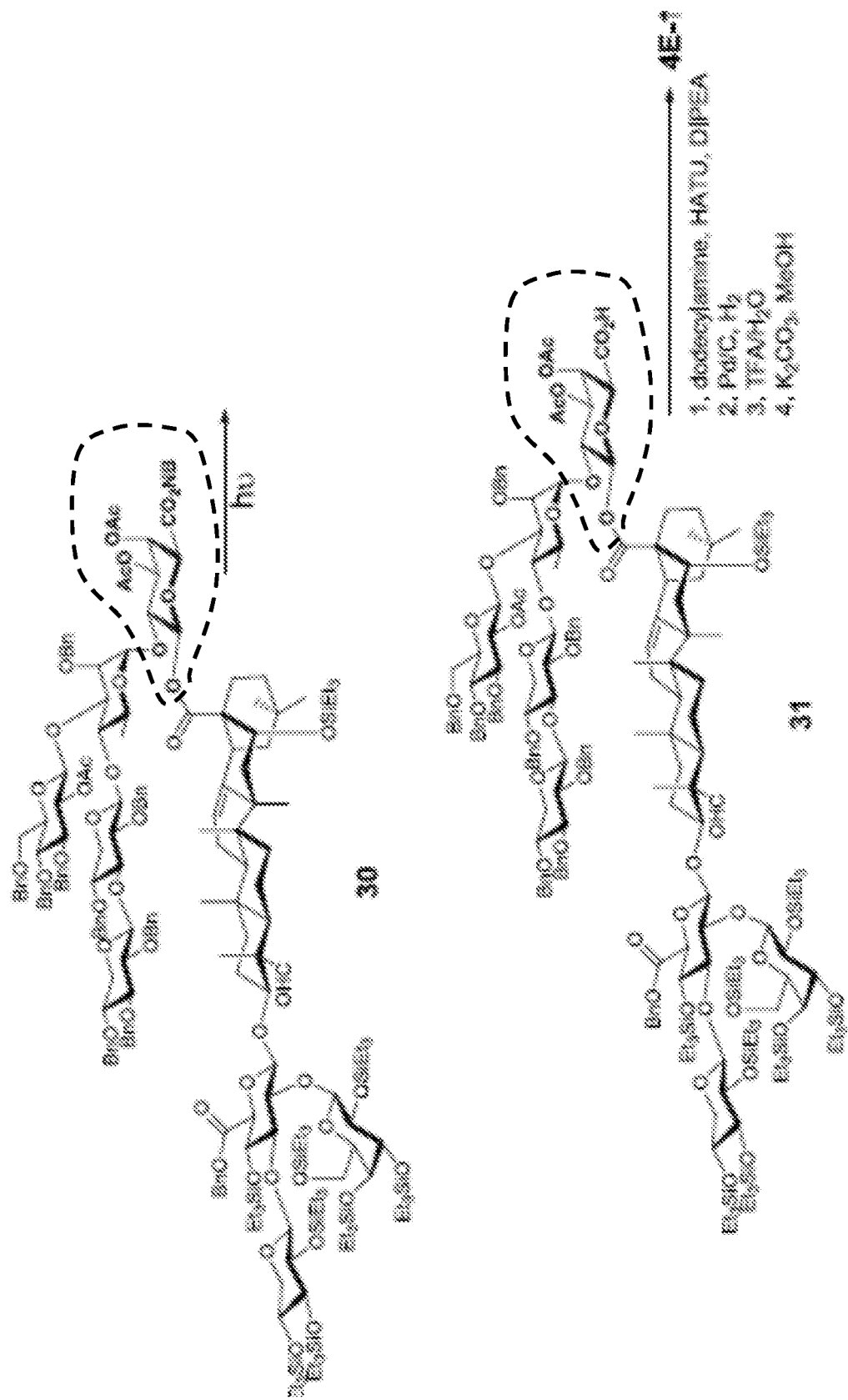
FIG. 12 illustrates a scheme for the East Wing derivatization of synthesis of the West Wing analogs of the saponins QS-17 and QS-18.

Synthesis of 4E-1 is shown in FIG. 12 (Scheme 5, FIG. 12). Similar to the synthesis of 10, the pentasaccharide intermediate 30 can be prepared by using the same reaction sequence except that a properly protected galacturonic acid building block (dashed circle) replaces the corresponding fucoside building block. After selective removal of the photolabile protecting group (i.e., 2-nitrobenzyl group) from the galacturonic acid unit with UV irradiation, the key intermediate 31 is obtained (FIG. 12). Its coupling with dodecylamine followed by global deprotection generates the desired 4E-1.

Since the structure of the side chain has a significant impact on adjuvant activity, different side chains can be incorporated through divergent synthesis from the key intermediate 31. The side chains can be incorporated into 31 for immunological evaluation and comparison against their counterparts.

Example 6

General Structure

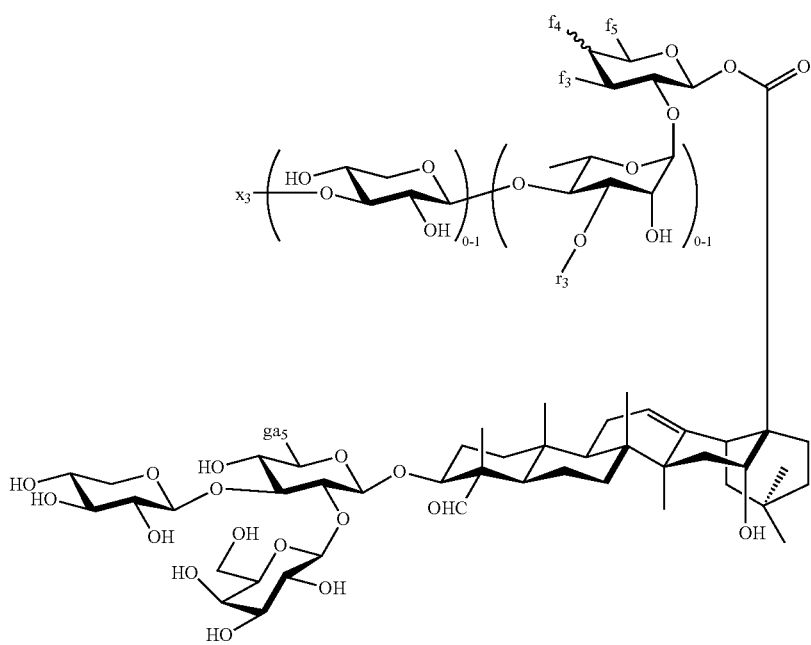

wherein:

q1 is H or OH;

f3 and f4 are each independently OH, acetyl, or a cyclic ketal ring or cyclic carbonate ester formed by the C3 and C4 of the fucosyl unit, f3, and f4;

f5 is a methyl group, carboxyl group or $R_4$—$NR_5$—C(O)—, or an alkoxy group having the structure $R_4$—O—, wherein $R_4$ and $R_5$ are each independently a linear chain having the structure $R_6(CH_2)_{0-20}$—, and wherein $R_6$ is H, OH, COOH, COOMe, COOEt, COOiPr, COOtBu, or COOBn;

r3 is H, a monosaccharide, a disaccharide, or a trisaccharide;

x3 is H, a monosaccharide, or a disaccharide; and ga5 is a carboxyl group, $R_4$—$NR_5$—C(O)—, or an alkoxy group having the structure $R_4$—O—, wherein $R_4$ and $R_5$ are each independently a linear chain having the structure $R_6(CH_2)_{0-20}$—, and wherein $R_6$ is H, OH, COOH, COOMe, COOEt, COOiPr, COOtBu, COOBn, a saccharide unit, a monophosphoryl lipid A (MPL), or a dipalmitoyl-S-glyceryl cysteine (PamCys) unit.

What is claimed:

1. A modified saponin having the formula:

wherein:
f3 and f4 are each independently OH, acetyl, or a cyclic ketal ring or cyclic carbonate ester formed by the C3 and C4 of the fucosyl unit, f3, and f4;
f5 is a methyl group, a carboxyl group, $R_4$—$NR_5$—C(O)—, or an alkoxy group having the structure $R_4$—O—, wherein $R_4$ and $R_5$ are each independently a linear chain having the structure $R_6$ $(CH_2)_{0-20}$—, and wherein $R_6$ is H, OH, COOH, COOMe, COOEt, COOiPr, COOtBu, or COOBn;
r3 is H, a monosaccharide, a disaccharide, or a trisaccharide;
x3 is H, a monosaccharide, or a disaccharide;
ga5 is a carboxyl group, $R_4$—$NR_5$—C(O)—, or an alkoxy group having the structure $R_4$—O—, $R_4$ is a linear chain having the structure $R_7$ $(CH_2)_{0-20}$—, and wherein $R_7$ is OH, COOH, COOMe, COOEt, COOiPr, COOtBu, COOBn, a monophosphoryl lipid A (MPL), or a dipalmitoyl-S-glyceryl cysteine (PamCys) unit, wherein $R_5$ is a linear chain having the structure $R_8$ $(CH_2)_{0-20}$—, and wherein $R_8$ is H, OH, COOH, COOMe, COOEt, COOiPr, COOtBu, COOBn, a saccharide unit, a monophosphoryl lipid A (MPL), or a dipalmitoyl-S-glyceryl cysteine (PamCys) unit; and
when f3 and f4 are both OH and f5 is a methyl group, ga5 is not a carboxyl group or $COOH(CH_2)_{0-20}$—NH—C(O)—.

2. A modified saponin having the formula I:

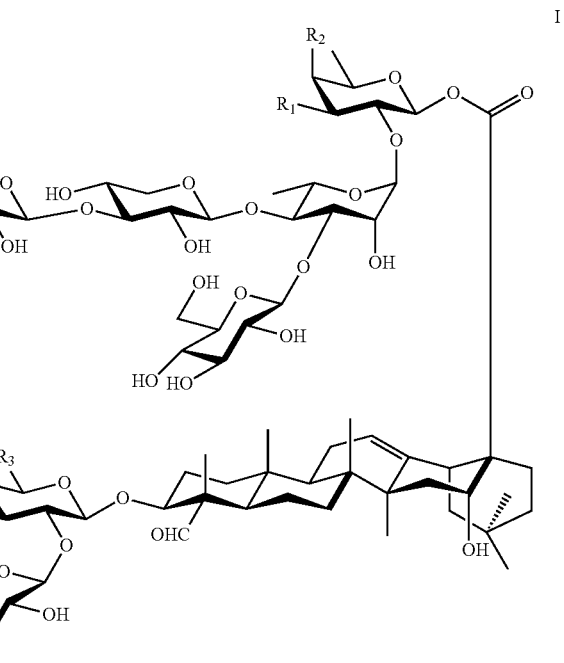

wherein:
$R_1$ and $R_2$ are each independently OH, acetyl, or a cyclic ketal ring or cyclic carbonate ester formed by the C3 and C4 of the fucosyl unit, $R_1$, and $R_2$;
$R_3$ is a carboxyl group, $R_4$-$NR_5$-C(O)—, or an alkoxy group having the structure $R_4$—O—, wherein $R_4$ is a saccharide unit or a linear chain having the structure $R_7$ $(CH_2)_{0-20}$-, and wherein $R_7$ is OH, COOH, COOMe, COOEt, COOiPr, COOtBu, COOBn, a monophosphoryl lipid A (MPL), or a dipalmitoyl-S-glyceryl cysteine (PamCys) unit, wherein $R_5$ is a linear chain having the structure $R_8$ $(CH_2)_{0-20}$—, and wherein $R_8$ is H, OH, COOH, COOMe, COOEt, COOiPr, COOtBu, COOBn, a saccharide unit, a monophosphoryl lipid A (MPL), or a dipalmitoyl-S-glyceryl cysteine (PamCys) unit; and
when $R_1$ and $R_2$ are both OH, $R_3$ is not a carboxyl group or $COOH(CH_2)_{0-20}$—NH—C(O)—.

3. The modified saponin of claim 2, wherein $R_1$ and $R_2$ are each OH.

4. The modified saponin of claim 2, wherein $R_1$ and $R_2$ are each acetyl.

5. The modified saponin of claim 2, wherein $R_1$ and $R_2$ form an acetonide group protecting the 3-OH and the 4-OH of the fucosyl unit.

6. The modified saponin of claim 2, wherein $R_1$ and $R_2$ form a carbonate ester group protecting the 3-OH and the 4-OH of the fucosyl unit.

7. The modified saponin of claim 2, wherein $R_3$ is a carboxyl group.

8. The modified saponin of claim 2, wherein $R_4$ is a long-chain fatty acid having the structure $HOOC$—$(CH_2)_{6-20}$—.

9. The modified saponin of claim 2, wherein $R_4$ is a long-chain fatty acid having the structure $HOOC$—$(CH_2)_{11}$.

10. The modified saponin of claim 2, wherein $R_3$ is an alkoxy group having the structure $R_7$—$(CH_2)_{6-20}$—O—.

11. The modified saponin of claim 2, wherein $R_4$ is a long-chain alcohol having the structure $HO$—$(CH_2)_{6-20}$—.

12. The modified saponin of claim 2, wherein $R_4$ is $R_7$—$(CH_2)_{6-20}$—.

13. The modified saponin of claim 2, wherein the saccharide unit of $R_4$ is a monosaccharide, a disaccharide, or trisaccharide.

14. The modified saponin of claim 2, wherein $R_4$ is a MPL unit.

15. The modified saponin of claim 2, wherein $R_4$ is a Pam2Cys unit or Pam3Cys unit.

16. A modified saponin having any of the formulas B-D:
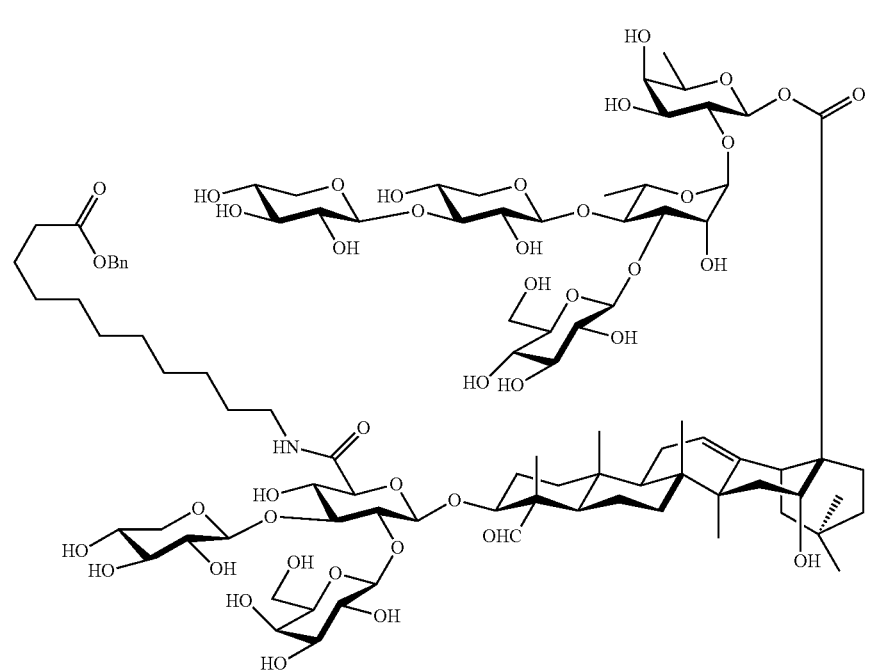
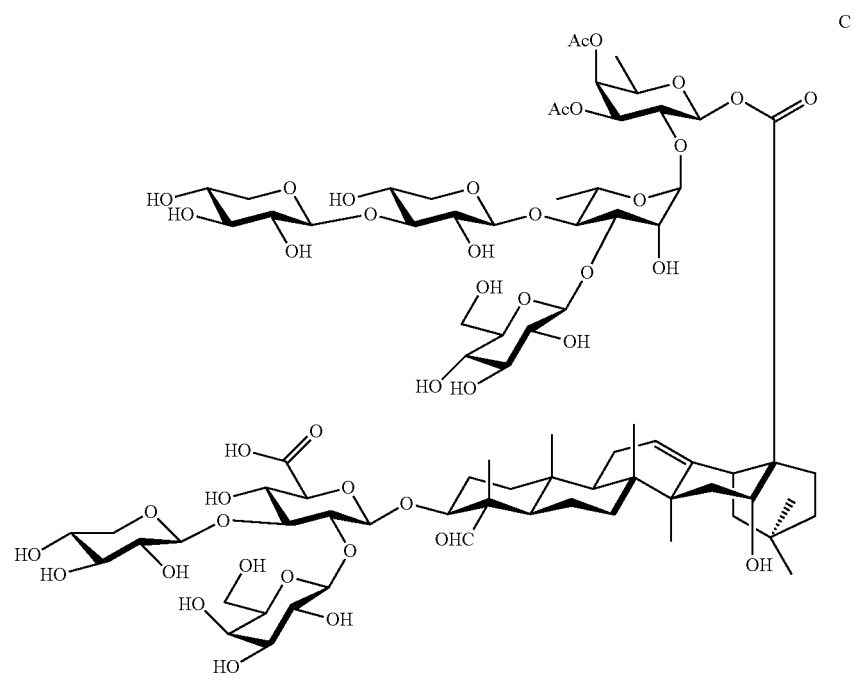

-continued
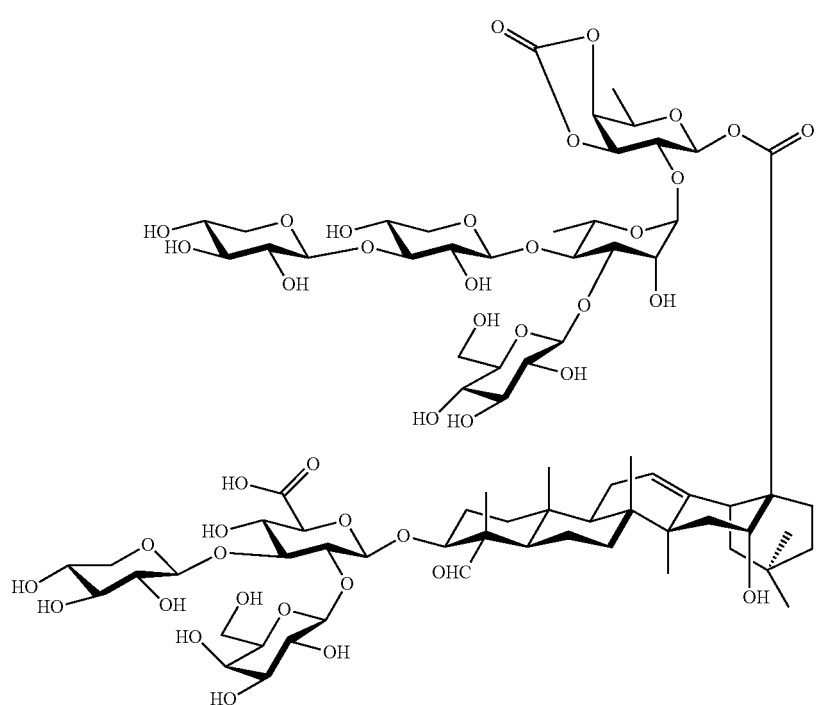
D
* * * * *